US012039931B1

(12) United States Patent
Hu

(10) Patent No.: US 12,039,931 B1
(45) Date of Patent: Jul. 16, 2024

(54) PIXEL CIRCUIT OF DISPLAY PANEL

(71) Applicant: NOVATEK Microelectronics Corp., Hsin-Chu (TW)

(72) Inventor: Yi-Jiang Hu, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/206,651

(22) Filed: Jun. 7, 2023

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0842* (2013.01); *G09G 2320/0233* (2013.01)

(58) Field of Classification Search
CPC ...... G09G 3/3233; G09G 3/3208; G09G 3/32; G09G 3/3225
See application file for complete search history.

(56) References Cited

U.S. PATENT DOCUMENTS 11,114,030 B1 * 9/2021 Lu ........................ G09G 3/3233
11,127,342 B2 * 9/2021 Feng ........................ G09G 3/32

* cited by examiner

*Primary Examiner* — Koosha Sharifi-Tafreshi
(74) *Attorney, Agent, or Firm* — Winston Hsu

(57) ABSTRACT

A pixel circuit of a display panel includes a light emitting device, a driving transistor, a capacitor, a first reset transistor and a second reset transistor. The driving transistor has a gate terminal. A first terminal of the capacitor is coupled to the gate terminal of the driving transistor, and a second terminal of the capacitor is coupled to a reset input terminal of the pixel circuit. A first terminal of the first reset transistor is coupled to the gate terminal of the driving transistor, and a second terminal of the first reset transistor is coupled to the reset input terminal. A first terminal of the second reset transistor is coupled to the light emitting device, and a second terminal of the second reset transistor is coupled to the reset input terminal.

32 Claims, 20 Drawing Sheets

PIXEL CIRCUIT OF DISPLAY PANEL

BACKGROUND OF THE INVENTION

1. Field of the Invention

The present invention relates to a pixel circuit of a display panel, and more particularly, to the structure of a pixel circuit of a display panel capable of canceling the offset of threshold voltages.

2. Description of the Prior Art

Among those next-generation display technologies, the micro organic light emitting diode (micro-OLED) panel has become important in recent years. Unlike conventional LED or OLED panels with their screens being built on a glass substrate, the screen of a micro-OLED panel is directly mounted to a silicon wafer. The silicon-based implementation could achieve a wide variety of benefits such as small size, light weight, low power consumption, high luminous efficiency, high contrast and high pixel density. With the above advantages, the micro-OLED panel is particularly suitable for augmented reality (AR) and virtual reality (VR) applications.

SUMMARY OF THE INVENTION

It is therefore an objective of the present invention to provide a novel pixel circuit for an organic light emitting diode (OLED) panel, especially a micro-OLED panel.

An embodiment of the present invention discloses a pixel circuit of a display panel, which comprises a light emitting device, a driving transistor, a capacitor, a first reset transistor and a second reset transistor. The driving transistor has a gate terminal. A first terminal of the capacitor is coupled to the gate terminal of the driving transistor, and a second terminal of the capacitor is coupled to a reset input terminal of the pixel circuit. A first terminal of the first reset transistor is coupled to the gate terminal of the driving transistor, and a second terminal of the first reset transistor is coupled to the reset input terminal. A first terminal of the second reset transistor is coupled to the light emitting device, and a second terminal of the second reset transistor is coupled to the reset input terminal.

Another embodiment of the present invention discloses a pixel circuit of a display panel, which comprises a light emitting device, a driving transistor, a capacitor, a first reset transistor and a second reset transistor. The driving transistor, which has a gate terminal, drives the light emitting device. The capacitor is coupled between a reset input terminal of the pixel circuit and the gate terminal of the driving transistor. The first reset transistor, coupled between the reset input terminal and the gate terminal of the driving transistor, initializes the driving transistor. The second reset transistor, coupled between the reset input terminal and the light emitting device, initializes the light emitting device. Wherein, the driving transistor and the light emitting device are initialized simultaneously.

Another embodiment of the present invention discloses a pixel circuit of a display panel, which comprises a light emitting device, a driving transistor, a capacitor, a first reset transistor and a second reset transistor. The driving transistor, which has a gate terminal, drives the light emitting device. The capacitor is coupled between a reset input terminal of the pixel circuit and the gate terminal of the driving transistor. The first reset transistor is coupled between the reset input terminal and the gate terminal of the driving transistor. The second reset transistor is coupled between the reset input terminal and the light emitting device. Wherein, the first reset transistor and the capacitor are connected in parallel.

Another embodiment of the present invention discloses a pixel circuit of a display panel, which comprises a light emitting device, a driving transistor, a capacitor, a first reset transistor, a second reset transistor and a cutoff transistor. The driving transistor, which has a gate terminal, drives the light emitting device. The capacitor is coupled between a reset input terminal of the pixel circuit and the gate terminal of the driving transistor. The first reset transistor is coupled between the reset input terminal and the gate terminal of the driving transistor. The second reset transistor is coupled between the reset input terminal and the light emitting device. The cutoff transistor, coupled to the driving transistor, cuts off a current path passing through the driving transistor when an initial voltage for initializing the driving transistor or the light emitting device is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
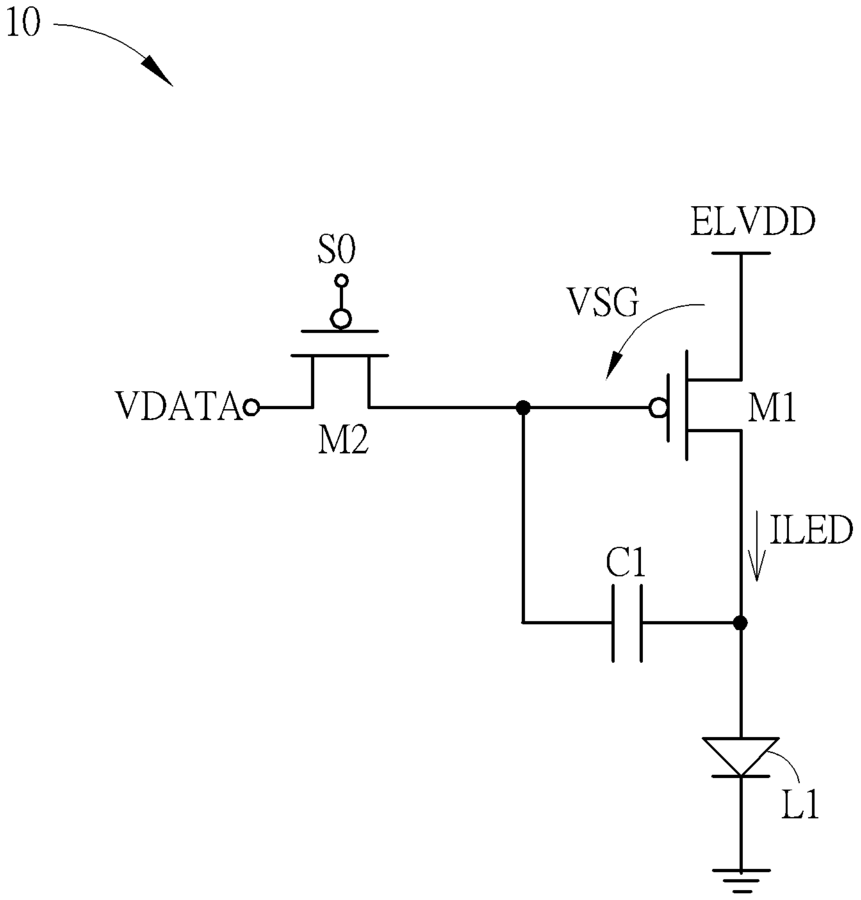
FIG. 1 is a schematic diagram of a pixel circuit of a display panel.

FIG. 1 is a schematic diagram of a pixel circuit 10 of a display panel. The display panel may be an organic light emitting diode (OLED) panel or a micro-OLED panel. The pixel circuit 10 includes transistors M1 and M2, a capacitor C1 and an OLED L1. The transistor M1, which may be a driving transistor, may output a driving current ILED to control the OLED L1 to emit light. The transistor M2, which is controlled by a control signal S0, may serve as a switch for receiving a display data VDATA. The display data VDATA that arrives at the gate terminal of the transistor M1 may determine the magnitude of the driving current ILED flowing through the OLED L1, thereby determining the brightness of the OLED L1. The capacitor C1 may store the display data VDATA received at the gate terminal of the transistor M1. The pixel circuit 10 may be operated by receiving a power supply voltage ELVDD from a power supply terminal.

Based on the behavior of the transistor M1, the magnitude of the driving current ILED may be determined according to the correspondence of the driving current ILED and the source-to-gate voltage VSG of the transistor M1. Based on the device mobility of the transistor M1, the relationship of the driving current ILED and the source-to-gate voltage VSG may follow a square law or exponential law. For example, if the pixel circuit 10 is implemented with a thin-film transistor (TFT) process, the mobility is lower and the driving current ILED output by the transistor M1 may be relatively low, and it is more possible that the transistor M1 is operated in the saturation region to follow the square law. If the pixel circuit 10 is implemented with a complementary metal-oxide semiconductor (CMOS) process as the silicon-based implementation of the micro-OLED panel, the device mobility is higher than in the TFT process. Therefore, in order to achieve an identical current magnitude, the transistor M1 may be operated in the sub-threshold region to follow the exponential law.

No matter whether the transistor M1 is operated based on the square law or exponential law, the driving current ILED and the source-to-gate voltage VSG have one-to-one correspondence, so that the driving current ILED may be determined according to the source-to-gate voltage VSG, which is further determined according to the display data VDATA. For the sake of brevity, the formula of square law is described herein, as shown below:

$$I\text{LED}=\beta(VSG-VTH)^2; \quad (1)$$

where β represents the gain factor of the transistor M1, and is determined according to the mobility, normalized oxide capacitance, and width/length ratio of the transistor; and VTH is the threshold voltage of the transistor M1. Since the source voltage of the transistor M1 equals the power supply voltage ELVDD and the gate voltage of the transistor M1 equals the display data VDATA when the display data VDATA is received, Equation (1) may be rewritten as:

$$I\text{LED}=\beta(\text{ELVDD}-V\text{DATA}-VTH)^2. \quad (2)$$

Note that the threshold voltage VTH is included in the formula for calculating the driving current ILED. In the display panel, the threshold voltage VTH of different pixels may not be uniform due to process and/or device variations. The mismatch and offset of the threshold voltage VTH may generate uneven brightness between the pixels, thereby generating the Mura effect. Therefore, the present invention provides a novel pixel circuit with appropriate controls to let the Mura effect caused by the offsets of the threshold voltage VTH to be minimized. Various embodiments of the pixel circuit capable of the DeMura functions are described hereinafter.

Figure 2:
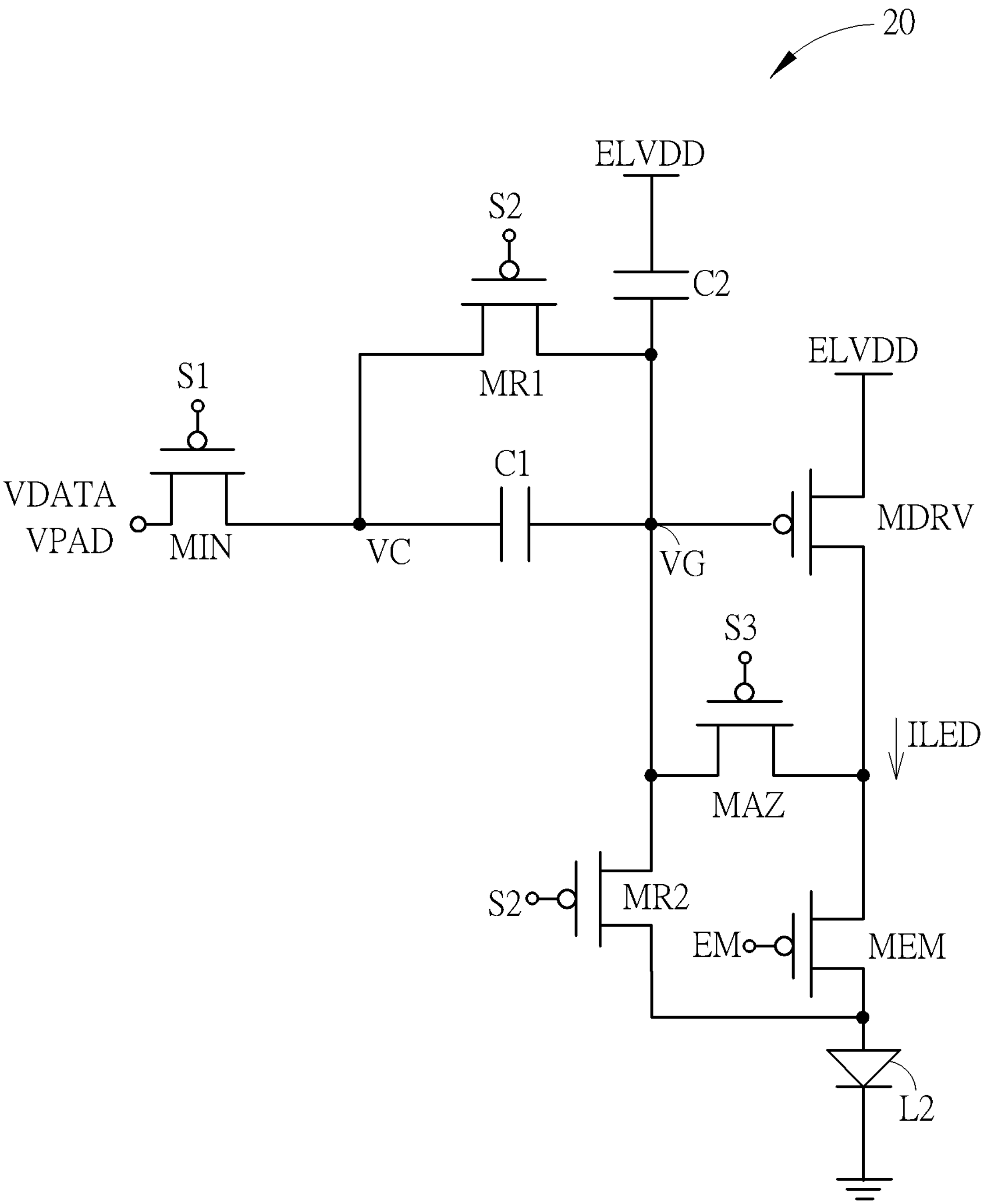
FIG. 2 is a schematic diagram of a pixel circuit of a display panel according to an embodiment of the present invention.

FIG. 2 is a schematic diagram of a pixel circuit 20 of a display panel according to an embodiment of the present invention. The pixel circuit 20 includes a driving transistor MDRV, an input transistor MIN, an offset control transistor MAZ, an emission control transistor MEM, two reset transistors MR1 and MR2, two capacitors C1 and C2, and a light emitting device L2. The driving transistor MDRV may output a driving current ILED to control the light emitting device L2 based on a display data VDATA. More specifically, the driving transistor MDRV may generate a drain current according to the received display data VDATA, and the drain current may serve as the driving current ILED output to drive the light emitting device L2 to emit light.

Other transistors of the pixel circuit 20 may serve as control switches for controlling the operations of the driving transistor MDRV and the light emitting device L2. These transistors may be deployed and controlled appropriately to cancel the deviations of the driving current ILED generated from the variations of the threshold voltage VTH of the driving transistor MDRV. In this embodiment, these transistors may receive control signals S1, S2, S3 and EM to realize the offset cancellation in several phases.

The capacitor C1 may be coupled between the gate terminal of the driving transistor MDRV and a reference node VC, and the capacitor C2 may be coupled between the gate terminal of the driving transistor MDRV and the power supply terminal that supplies the power supply voltage ELVDD. When the display data VDATA is received, the information associated with the display data VDATA may be stored in the capacitors C1 and/or C2. The capacitors C1 and/or C2 may also store the information of the threshold voltage VTH of the driving transistor MDRV. In addition, the capacitor C1 may be coupled between a reset input terminal of the pixel circuit 20 and the gate terminal of the driving transistor MDRV. In this embodiment, the reset input terminal is the same as the data input terminal (i.e., VPAD); that is, both the initial voltage VINT (used for reset or initialization) and the display data VDATA are received from the same terminal.

The input transistor MIN is coupled between the data input terminal VPAD of the pixel circuit 20 and the reference node VC, to serve as a switch for controlling the reception of the display data VDATA. In detail, a first terminal of the input transistor MIN may be coupled to the data input terminal VPAD to receive the display data VDATA, a second terminal of the input transistor MIN may be coupled to the reference node VC, and the gate terminal of the input transistor MIN may receive the control signal S1. The input transistor MIN is responsible for controlling the pixel circuit 20 to receive the display data VDATA.

The offset control transistor MAZ is coupled between the gate terminal of the driving transistor MDRV and the drain terminal of the driving transistor MDRV, to serve as a switch for synchronizing the offset information (i.e., information of the threshold voltage VTH) between the gate and drain terminals of the driving transistor MDRV. In detail, a first terminal of the offset control transistor MAZ may be coupled to the drain terminal of the driving transistor MDRV, a second terminal of the offset control transistor MAZ may be coupled to the gate terminal of the driving transistor MDRV, and the gate terminal of the offset control transistor MAZ may receive the control signal S3.

The emission control transistor MEM is coupled between the drain terminal of the driving transistor MDRV and the light emitting device L2, to serve as a switch for controlling light emission of the pixel circuit 20. In detail, a first terminal of the emission control transistor MEM may be coupled to the drain terminal of the driving transistor MDRV, a second terminal of the emission control transistor MEM may be coupled to the anode of the light emitting device L2, and the gate terminal of the emission control transistor MEM may receive the emission control signal EM. The emission control transistor MEM is responsible for controlling the driving current ILED generated by the driving transistor MDRV to flow to the light emitting device L2.

The reset transistor MR1 is coupled between the gate terminal of the driving transistor MDRV and the reference node VC, to serve as a switch for initializing the gate terminal of the driving transistor MDRV. In detail, a first terminal of the reset transistor MR1 may be directly connected to the gate terminal of the driving transistor MDRV, a second terminal of the reset transistor MR1 may be coupled to the reference node VC, to be further coupled to the reset input terminal (i.e., the data input terminal VPAD in this embodiment), and the gate terminal of the reset transistor MR1 may receive the control signal S2. The reset transistor MR1 is responsible for controlling the initialization or reset of the driving transistor MDRV, where the reset transistor MR1 may form a signal path for forwarding the initial voltage VINT to the driving transistor MDRV to initialize the driving transistor MDRV.

The reset transistor MR2 is coupled between the light emitting device L2 and the gate terminal of the driving transistor MDRV, to serve as a switch for initializing the light emitting device L2. In detail, a first terminal of the reset transistor MR2 may be directly connected to the anode of the light emitting device L2, a second terminal of the reset transistor MR2 may be coupled to the gate terminal of the driving transistor MDRV, to be further coupled to the reference node VC and the reset input terminal (i.e., the data input terminal VPAD in this embodiment). The reset transistor MR2 is responsible for controlling the initialization or reset of the light emitting device L2, where the reset transistor MR2 may form a signal path for forwarding the initial voltage VINT to the light emitting device L2 to initialize the light emitting device L2.

The light emitting device L2 is coupled between the emission control transistor MEM and the ground terminal. The light emitting device L2, which may emit light when driven by the driving current ILED received from the driving transistor MDRV, may be any device capable of emitting light by receiving currents, such as an OLED.

Figure 3:
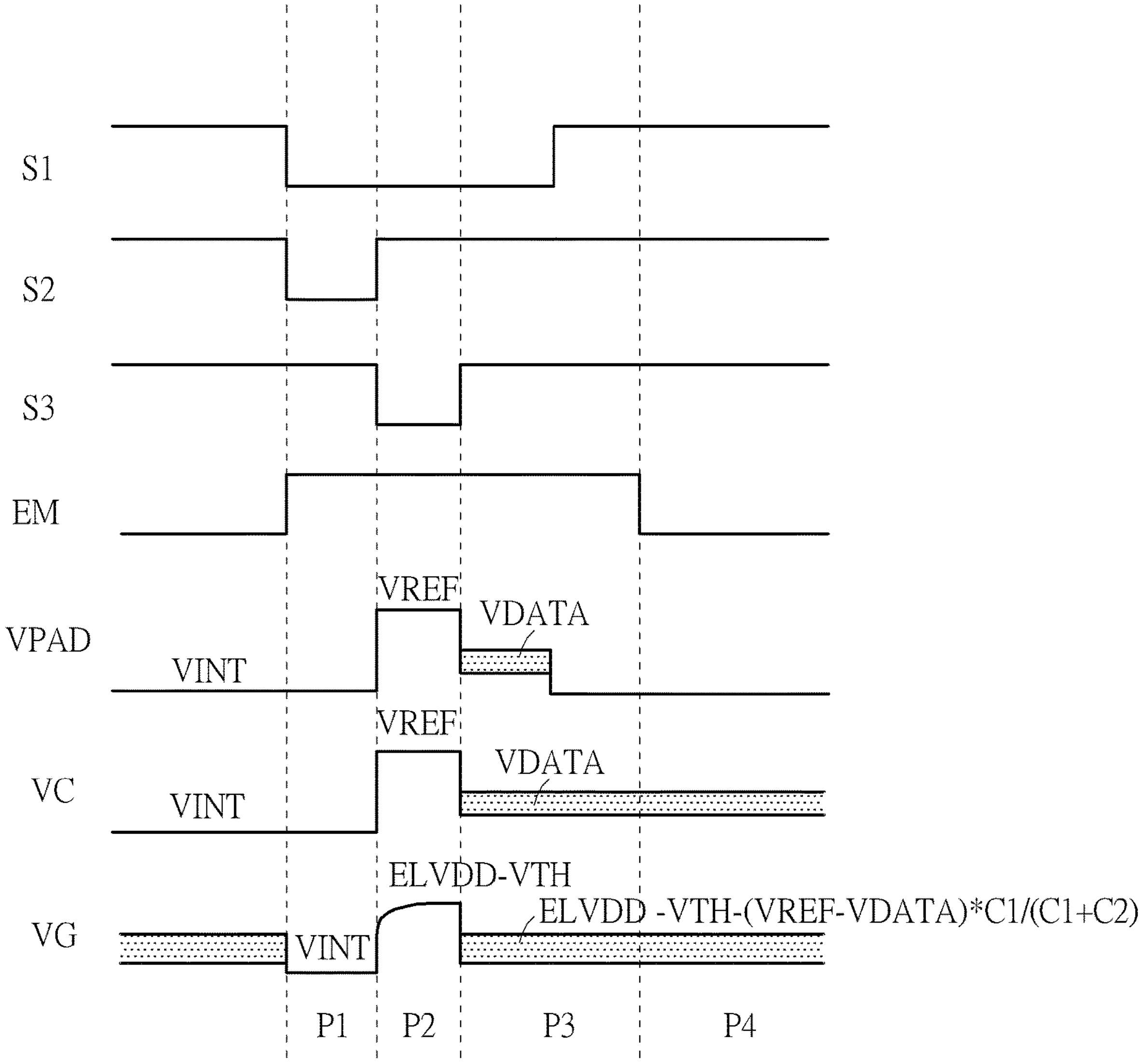
FIG. 3 is a waveform diagram of related signals and voltages of the pixel circuit shown in FIG. 2.

The operations of the pixel circuit 20 include several phases. FIG. 3 is a waveform diagram of related signals and voltages of the pixel circuit 20, where the waveforms of the control signals S1-S3, the emission control signal EM, the voltage of the data input terminal VPAD, the voltage at the reference node VC, and the gate voltage VG of the driving transistor MDRV are shown. Note that in this embodiment, the transistors in the pixel circuit 20 are all PMOS transistors, and thus the signals in low level may turn on the corresponding transistors and in high level may turn off the corresponding transistors. FIG. 3 shows that the operations of the pixel circuit 20 have 4 phases P1-P4, which are illustrated in FIGS. 4A-4D, respectively.

Figure 4A:
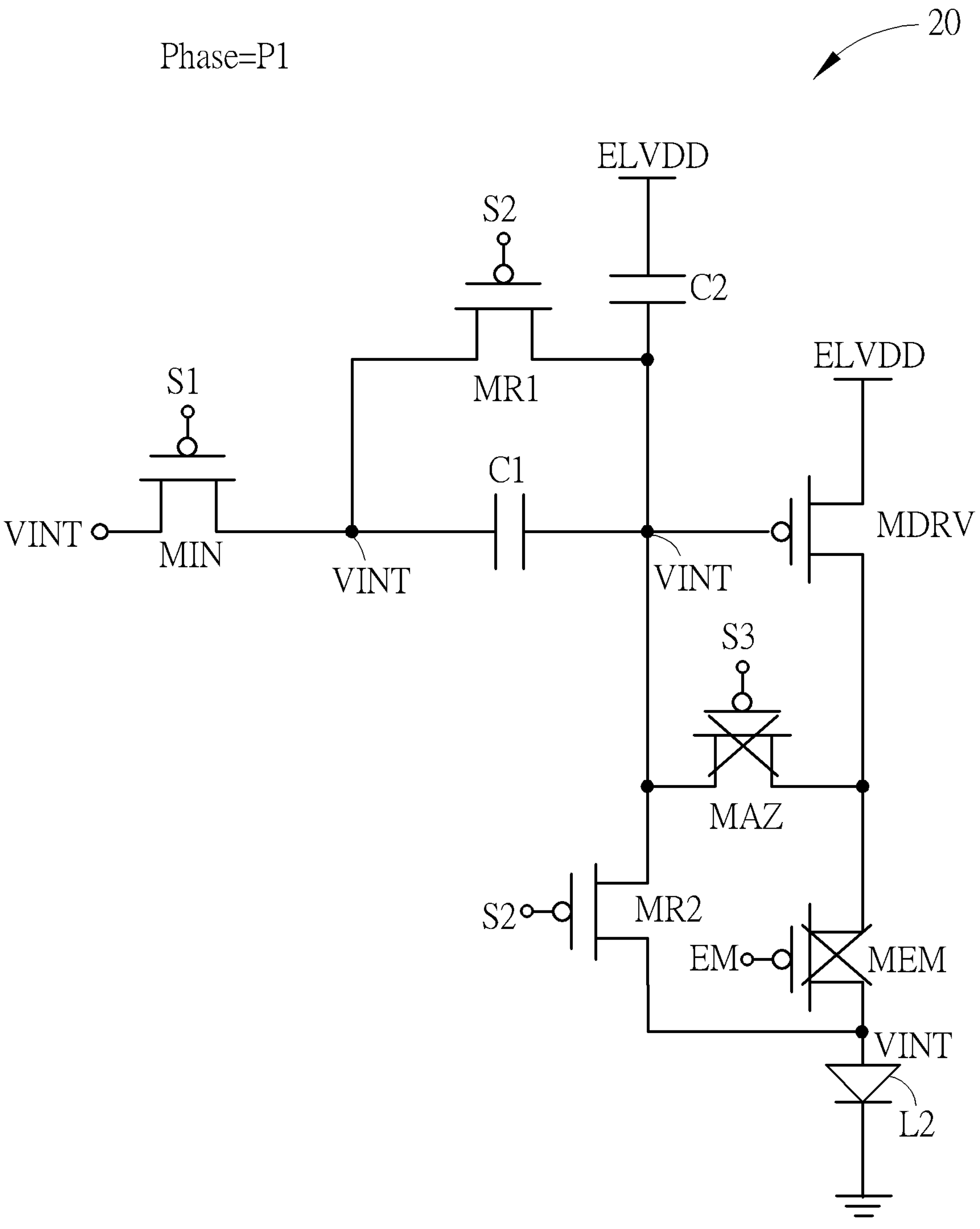
FIGS. 4A-4D illustrate the operations of the pixel circuit in several phases.

Referring to FIG. 4A along with FIG. 3, the phase P1 may be regarded as a reset phase (or called initial phase or pre-charge phase), where the input transistor MIN and the reset transistors MR1 and MR2 are turned on, and the offset control transistor MAZ and the emission control transistor MEM are turned off. In the phase P1, the pixel circuit 20 receives an initial voltage VINT through the data input terminal VPAD. Since the input transistor MIN and the reset transistor MR1 are conducted, the gate terminal of the driving transistor MDRV is initialized or reset to the initial voltage VINT. In addition, since the reset transistor MR2 is conducted, the anode of the light emitting device L2 is also initialized or reset to the initial voltage VINT. As for the light emitting device L2, the initial voltage VINT should be low enough to prevent the light emitting device L2 from emitting light in this phase.

In the embodiments of the present invention, the driving transistor MDRV and the light emitting device L2 may be initialized simultaneously in the phase P1, and the driving transistor MDRV and the light emitting device L2 may be initialized by receiving the same initial voltage VINT. In the pixel circuit 20, the initial voltage VINT is received from the data input terminal VPAD, which means that the reset input terminal is the data input terminal VPAD, where the initial voltage VINT and the display data VDATA are received from the same terminal. The common terminal for reset input and data input helps reduce the pin count and line count in the pixels of the display panel. For example, the lines for controlling the pixel circuit 20 include one power line, one ground line and one data/signal line (through VPAD), which is quite simplified as compared to other proposed pixel circuits in the related art.

In addition, in the phase P1, since the emission control transistor MEM is turned off, there is no leakage current passing through the current path of the driving transistor MDRV and the light emitting device L2. In such a situation, the emission control transistor MEM may serve as a cutoff transistor for cutting off the current path passing through the driving transistor MDRV and the light emitting device L2 in the reset phase where the initial voltage VINT is received. Therefore, the overall current consumption of the display panel may be reduced.

If there is a leakage current during the reset phase P1, the initial voltage actually received at the anode of the light emitting device L2 may be pulled by the leakage current, to possess a deviation from the initial voltage VINT received at the reset input terminal. Therefore, in the reset phase, it is preferable to avoid the leakage current flowing through the light emitting device L2, to well handle the initial voltage actually received by the light emitting device L2.

As mentioned above, the emission control transistor MEM may be off in the phase P1; hence, the reset transistor MR2 should be directly connected to the light emitting device L2 without through the emission control transistor MEM, so that the light emitting device L2 may be successfully initialized through the reset transistor MR2.

Figure 4B:
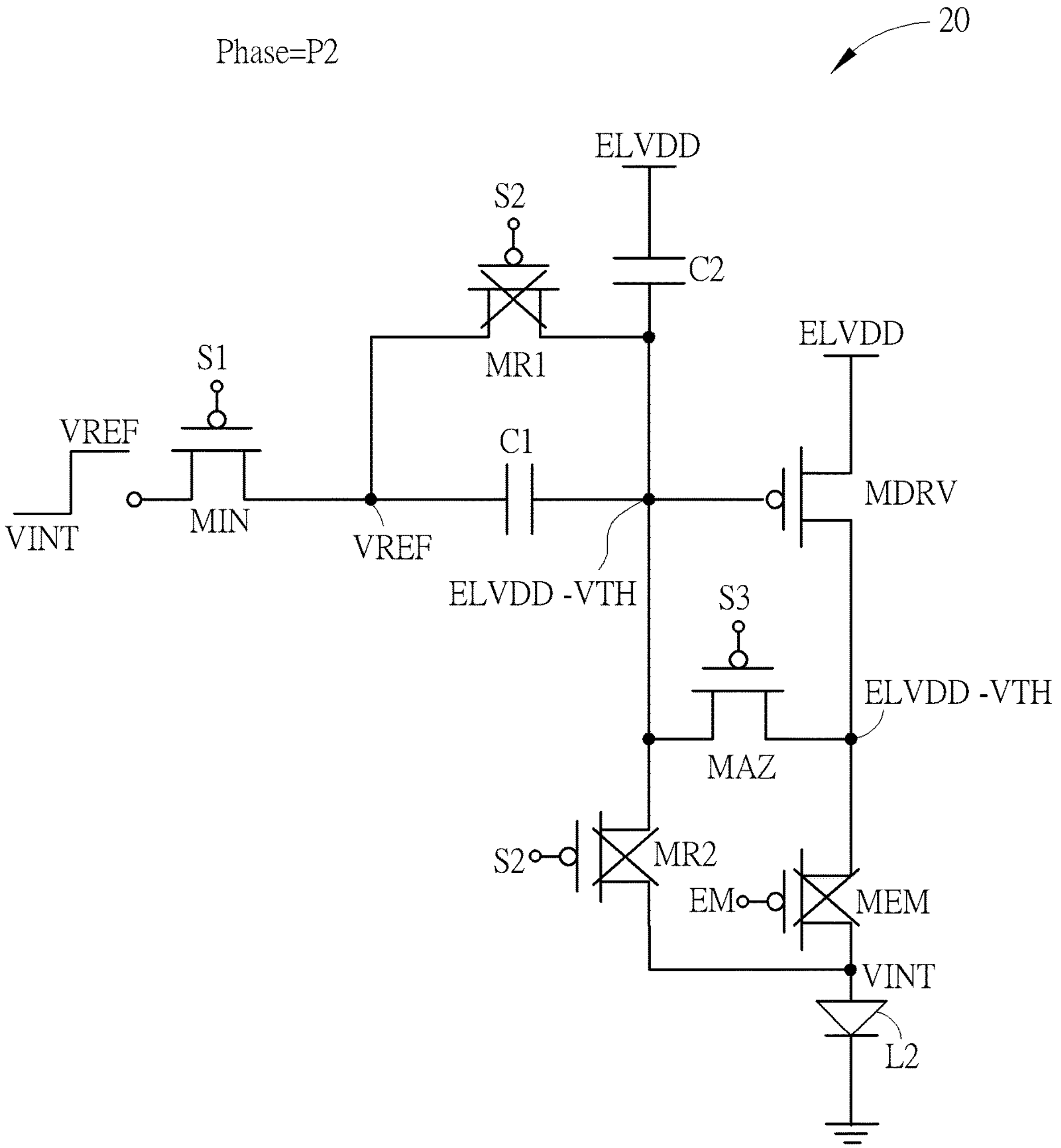

Referring to FIG. 4B along with FIG. 3, in the phase P2, the reset transistors MR1 and MR2 are turned off, the offset control transistor MAZ is turned on, the input transistor MIN keeps on, and the emission control transistor keeps off. The phase P2 is used for storing the information of the threshold voltage VTH. More specifically, the source terminal of the driving transistor MDRV receives the power supply voltage ELVDD, causing that the gate voltage VG of the driving transistor MDRV rises to ELVDD-VTH, and the drain voltage of the driving transistor MDRV also reaches ELVDD-VTH with the conducted offset control transistor MAZ. The charges corresponding to the gate voltage ELVDD-VTH are thereby stored in the capacitors C1 and C2. At this moment, the voltage at the data input terminal VPAD may rise from the initial voltage VINT to a reference voltage VREF to be ready for receiving the display data VDATA in the next phase, thereby pulling the voltage at the reference node VC to VREF.

Figure 4C:
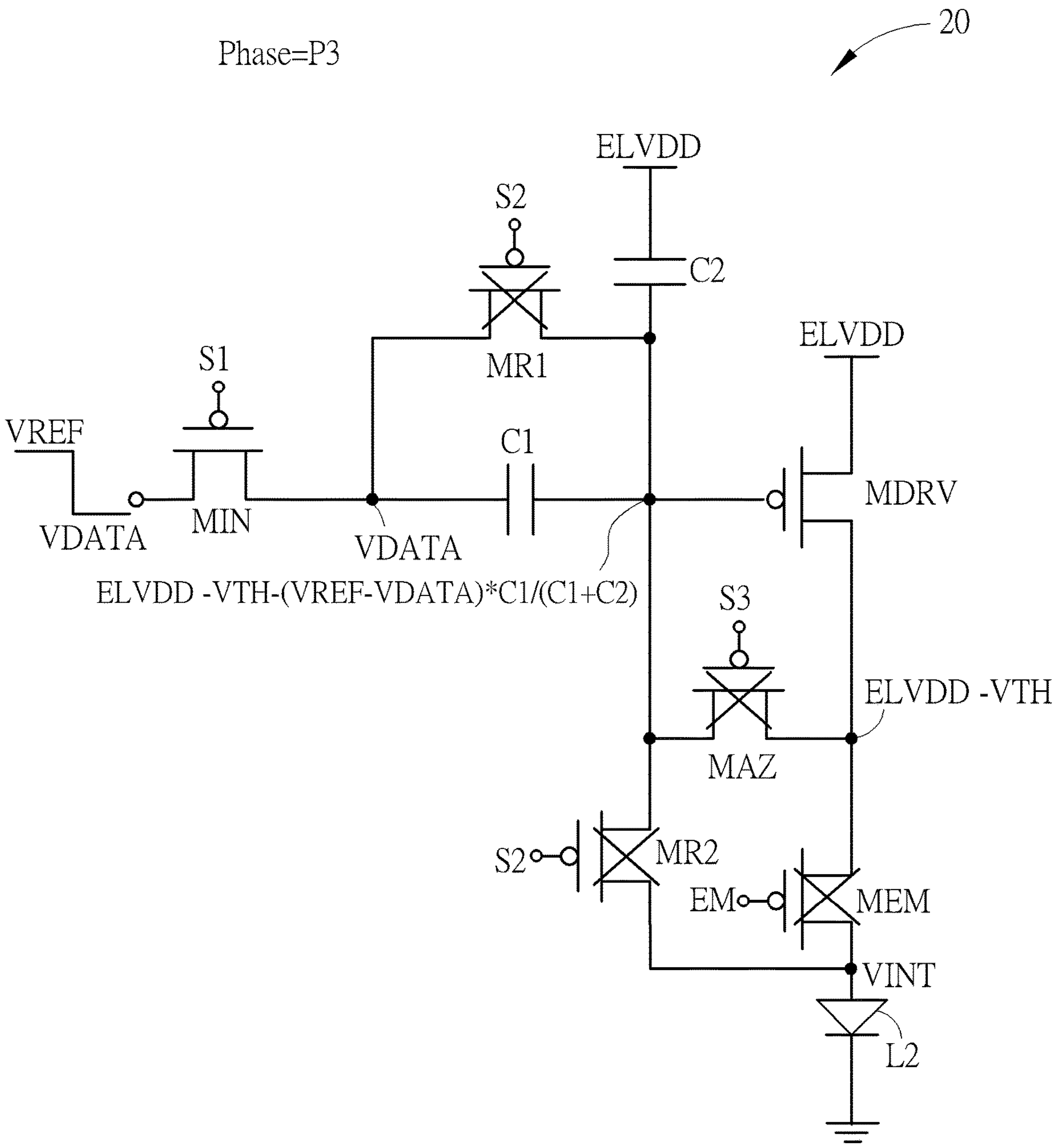

Referring to FIG. 4C along with FIG. 3, the phase P3 may be regarded as a scan phase, where the offset control transistor MAZ is turned off, the input transistor MIN keeps on, and the emission control transistor MEM and the reset transistors MR1 and MR2 keep off. In this phase, the display data VDATA is input from the data input terminal VPAD. With the conducted input transistor MIN, the voltage at the reference node VC may decrease to the voltage of the display data VDATA, which may be written into the gate terminal of the driving transistor MDRV through the capacitor C1. More specifically, the voltage at the reference node VC changes from the reference voltage VREF to the display data VDATA, and this voltage variation may be coupled to the gate terminal of the driving transistor MDRV through the capacitor C1. With the voltage division of the capacitors C1 and C2, the gate voltage VG will be equal to:

$$VG = ELVDD - VTH - (VREF - VDATA)\times\frac{C1}{C1+C2}. \tag{3}$$

In this phase, the gate voltage VG may include the information of the display data VDATA and the threshold voltage VTH.

Figure 4D:
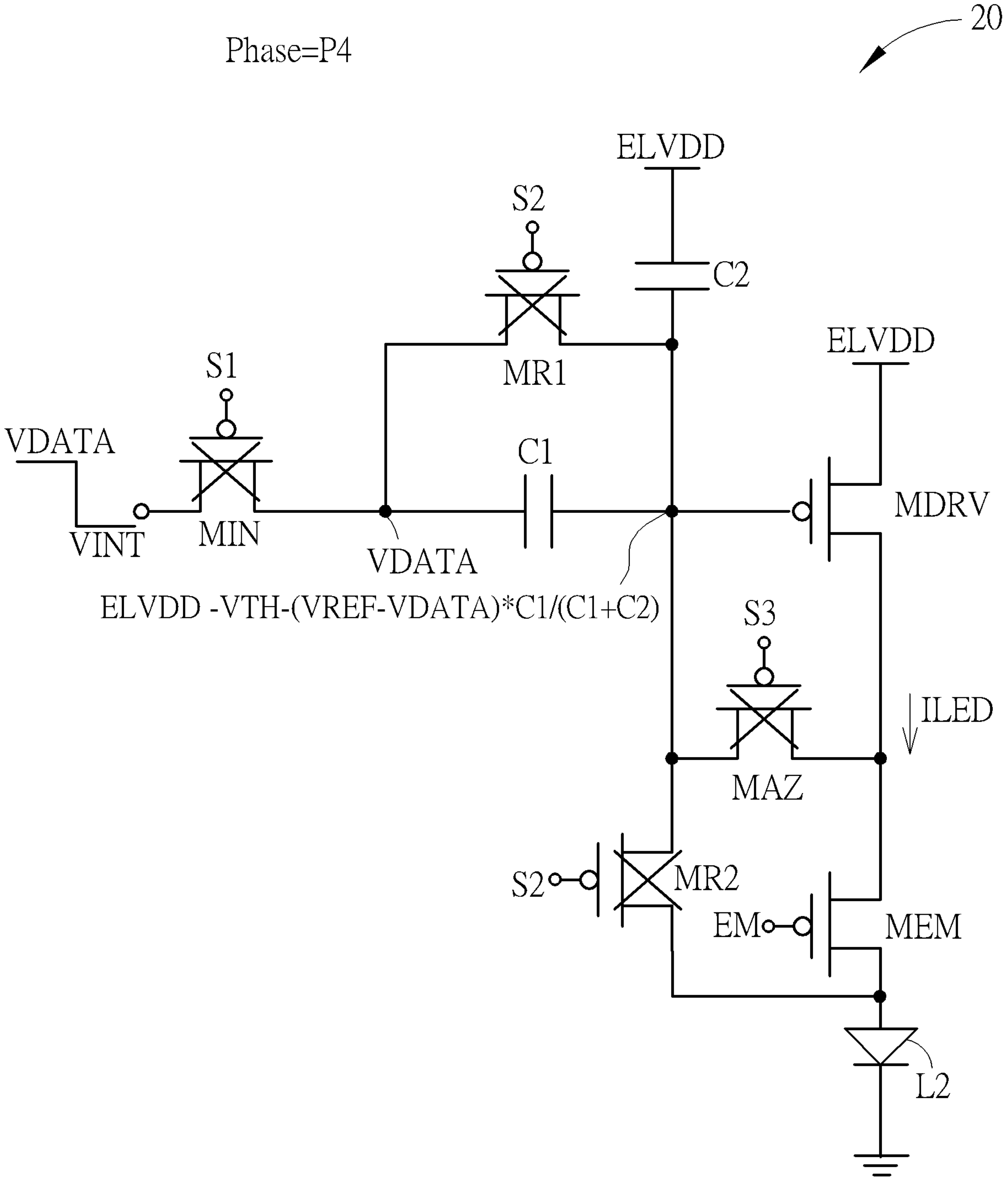

Referring to FIG. 4D along with FIG. 3, the phase P4 may be regarded as an emission phase, where the emission control transistor MEM is turned on, and other transistors are all off. The conducted emission control transistor MEM allows the driving current ILED to be forwarded to the light emitting device L2, so that the light emitting device L2 may emit light. Since the information of the gate voltage VG is stored in the capacitors C1 and C2, the driving current ILED may keep at its target level during the emission time.

As mentioned above, the brightness emitted by the light emitting device L2 may be determined according to the magnitude of the driving current ILED, which is further determined according to the source-to-gate voltage VSG of the driving transistor MDRV. In an embodiment, if the pixel circuit 20 is implemented with the TFT process to be deployed on the panel, the operations of the driving transistor MDRV may follow the square law, and the driving current ILED may be calculated as follows:

$$\begin{aligned} ILED &= \beta(VSG - VTH)^2 \\ &= \beta\left(ELVDD - \left(ELVDD - VTH - (VREF - VDATA)\times\frac{C1}{C1+C2}\right) - VTH\right)^2; \\ &= \beta\left((VREF - VDATA)\times\frac{C1}{C1+C2}\right)^2 \end{aligned} \tag{4}$$

where β represents the gain factor of the driving transistor MDRV and equals:

$$\beta = \frac{\mu_n \times C_{OX}}{2}\times\frac{W}{L};$$

where $\mu_n$ is the mobility of the driving transistor MDRV, $C_{OX}$ is the normalized oxide capacitance of the driving transistor MDRV, and W/L is the width/length ratio of the driving transistor MDRV.

As can be seen in Equation (4), the value of the driving current ILED only includes a signal dependent term consisting of the display data VDATA, and will not depend on the threshold voltage VTH, which means that the offset of the threshold voltage VTH between pixels would not influence the current magnitude and the brightness of the light emitting device L2. The parameter ß may not generate a significant mismatch or offset that needs to be canceled. As a result, the problem of brightness non-uniformity may be solved.

In another embodiment, the pixel circuit 20 may be implemented with a complementary metal-oxide semiconductor (CMOS) process as the silicon-based implementation in an integrated circuit (IC), such as in a micro-OLED panel. Therefore, the device mobility of the transistors is higher than that in the TFT process, and thus the driving transistor MDRV of the pixel circuit 20 may be operated in the sub-threshold region, which follows the formula as:

$$\begin{aligned} ILED &= I_{D0}\times e^{\frac{(VSG-VTH)}{n\times V_t}} \\ &= I_{D0}\times e^{\frac{(ELVDD-(ELVDD-VTH-(VREF-VDATA)\times C1/(C1+C2))-VTH)}{n\times V_t}}; \\ &= I_{D0}\times e^{\frac{((VREF-VDATA)\times C1/(C1+C2))}{n\times V_t}} \end{aligned} \tag{5}$$

and $$I_{D0} = \mu_n C_{OX}(n-1)V_t^2\times\frac{W}{L}; \tag{6}$$

where $\mu_n$ is the mobility of the driving transistor MDRV, $C_{OX}$ is the normalized oxide capacitance of the driving transistor MDRV, W/L is the width/length ratio of the driving transistor MDRV, $V_t$ is the thermal voltage, and n is equal to $(C_{OX}+C_{depl})/C_{OX}\approx 1.5$, where $C_{depl}$ is the depletion capacitance of the driving transistor MDRV. Note that the effects of the threshold voltage VTH may also be minimized or canceled under the exponential law.

As shown in FIG. 2, in the pixel circuit 20, both the reset transistor MR1 and the capacitor C1 are coupled between the reset/data input terminal VPAD and the driving transistor MDRV. More specifically, a first terminal of the reset transistor MR1 and a first terminal of the capacitor C1 are commonly coupled to the reset/data input terminal VPAD through the input transistor MIN, and a second terminal of the reset transistor MR1 and a second terminal of the capacitor C1 are commonly and directly connected to the gate terminal of the driving transistor MDRV. In such a situation, the reset transistor MR1 and the capacitor C1 are connected in parallel.

Although the reset transistor MR1 and the capacitor C1 may be connected in parallel, they provide different functions. In the reset phase (i.e., P1), the reset transistor MR1 is conducted, and the initial voltage VINT received from the data input terminal VPAD may be forwarded to the gate terminal of the driving transistor MDRV through the reset transistor MR1. In the scan phase (i.e., P3), the reset transistor MR1 is off, and the display data VDATA received from the data input terminal VPAD may be coupled to the gate terminal of the driving transistor MDRV through the capacitor C1, to generate a voltage variation on the gate terminal of the driving transistor MDRV.

Note that the structure of the pixel circuit 20 is merely an exemplary embodiment of the present invention. In order to reduce or cancel the Mura effect resulting from the offset of the threshold voltage VTH, other similar pixel structures may also be applied.

Figure 5:
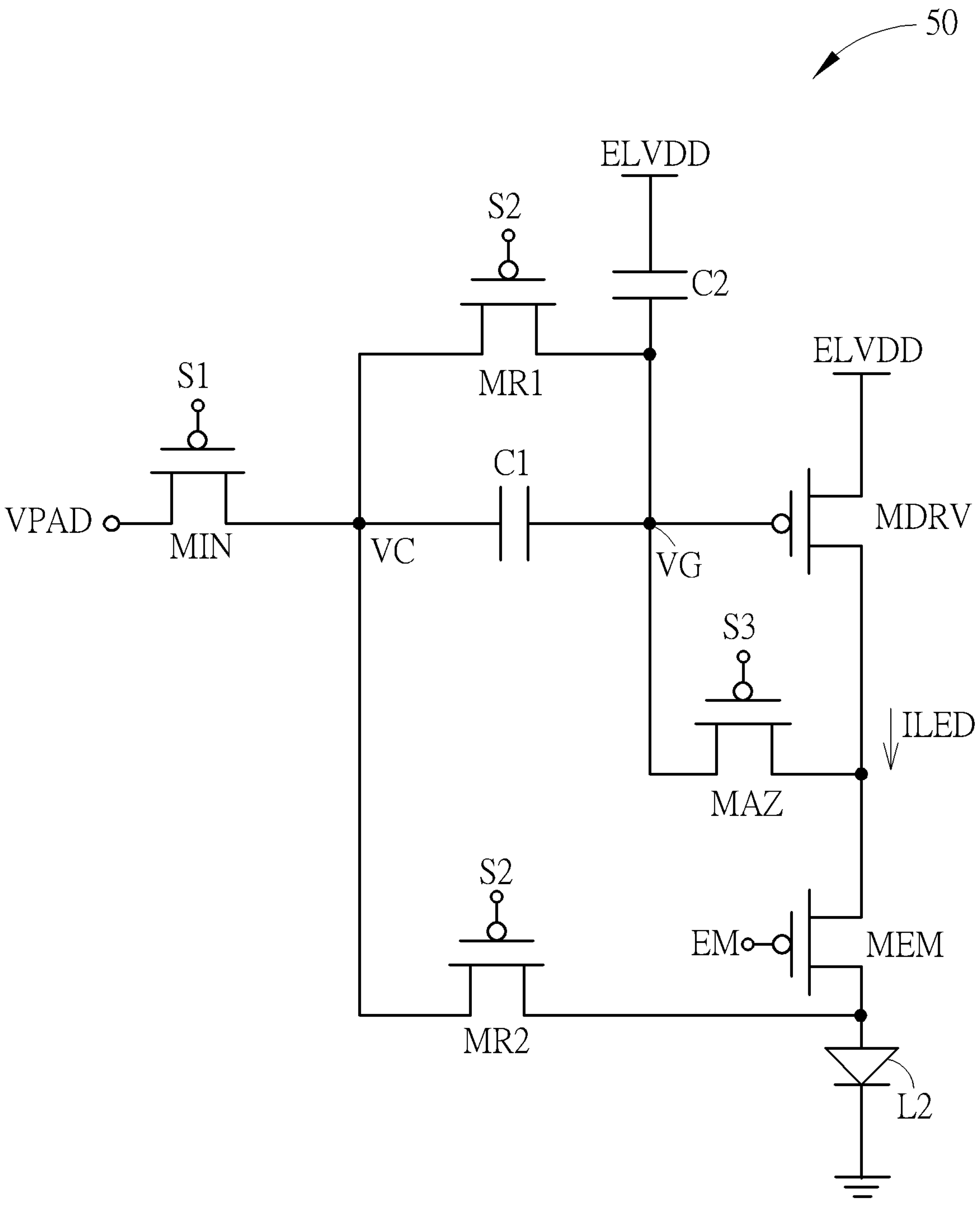
FIG. 5 is a schematic diagram of a pixel circuit of a display panel according to an embodiment of the present invention.

FIG. 5 is a schematic diagram of a pixel circuit 50 of a display panel according to an embodiment of the present invention. The structure of the pixel circuit 50 is similar to the structure of the pixel circuit 20, so signals and elements having similar functions are denoted by the same symbols. The difference between the pixel circuit 50 and the pixel circuit 20 is that, in the pixel circuit 50, the reset transistor MR2 is directly connected to the reference node VC instead of being coupled to the reference node VC through the reset transistor MR1.

Figure 6:
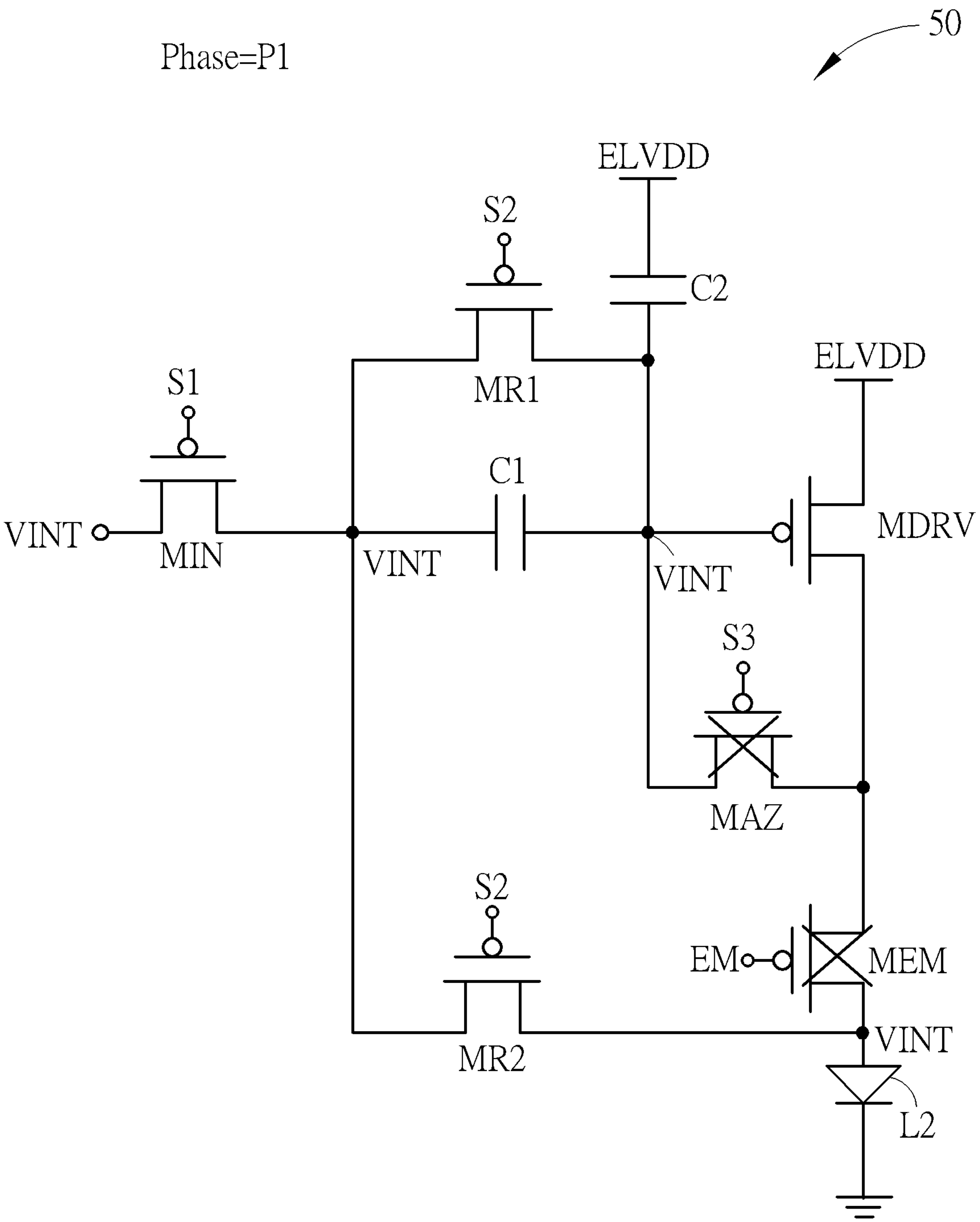
FIG. 6 illustrates the operations of the pixel circuit in the reset phase.

FIG. 6 illustrates the operations of the pixel circuit 50 in the phase P1 (i.e., the reset phase), where the input transistor MIN and the reset transistors MR1 and MR2 are turned on, and the offset control transistor MAZ and the emission control transistor MEM are turned off. In the reset phase, the pixel circuit 20 receives an initial voltage VINT through the data input terminal VPAD. The initial voltage VINT is forwarded to the gate terminal of the driving transistor MDRV through the input transistor MIN and the reset transistor MR1, to initialize the driving transistor MDRV. The initial voltage VINT is also forwarded to the anode of the light emitting device L2 through the input transistor MIN and the reset transistor MR2, to initialize the light emitting device L2. The detailed operations of the pixel circuit 50 are similar to those of the pixel circuit 20, and will be omitted herein.

Figure 7:
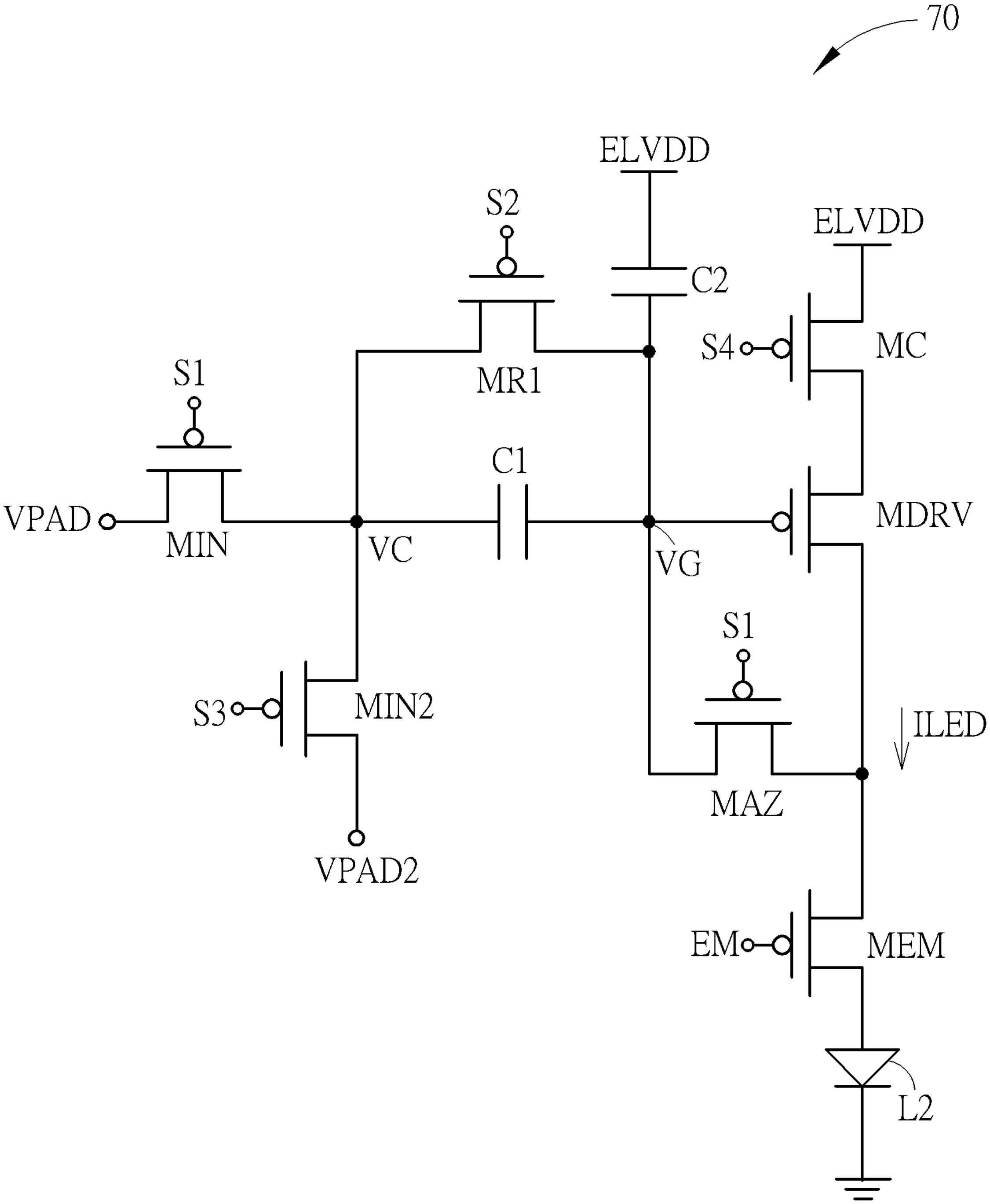
FIG. 7 is a schematic diagram of a pixel circuit of a display panel according to an embodiment of the present invention.

FIG. 7 is a schematic diagram of a pixel circuit 70 of a display panel according to an embodiment of the present invention. The structure of the pixel circuit 70 is similar to the structure of the pixel circuit 20, so signals and elements having similar functions are denoted by the same symbols. The difference between the pixel circuit 70 and the pixel circuit 20 is that, the pixel circuit 70 further includes a reset input terminal VPAD2 in addition to the data input terminal VPAD, and the reset input terminal VPAD2 is coupled to the reference node VC through another input transistor MIN2. In addition, the pixel circuit 70 further includes a cutoff transistor MC coupled to the source terminal of the driving transistor MDRV, and the reset transistor MR2 is omitted, where the initialization of the light emitting device L2 may be performed by using the offset control transistor MAZ and the emission control transistor MEM. The cutoff transistor MC, which is coupled between the source terminal of the driving transistor MDRV and the power supply terminal that provides the power supply voltage ELVDD, may be controlled by a control signal S4.

In the pixel circuit 70, the reset input terminal VPAD2 for receiving the initial voltage VINT is different from the data input terminal VPAD for receiving the display data VDATA. The input transistor MIN of the data input terminal VPAD may be conducted in the scan phase for receiving the display data VDATA. The input transistor MIN2 of the reset input terminal VPAD2 may be conducted in the reset phase for receiving the initial voltage VINT.

Figure 8:
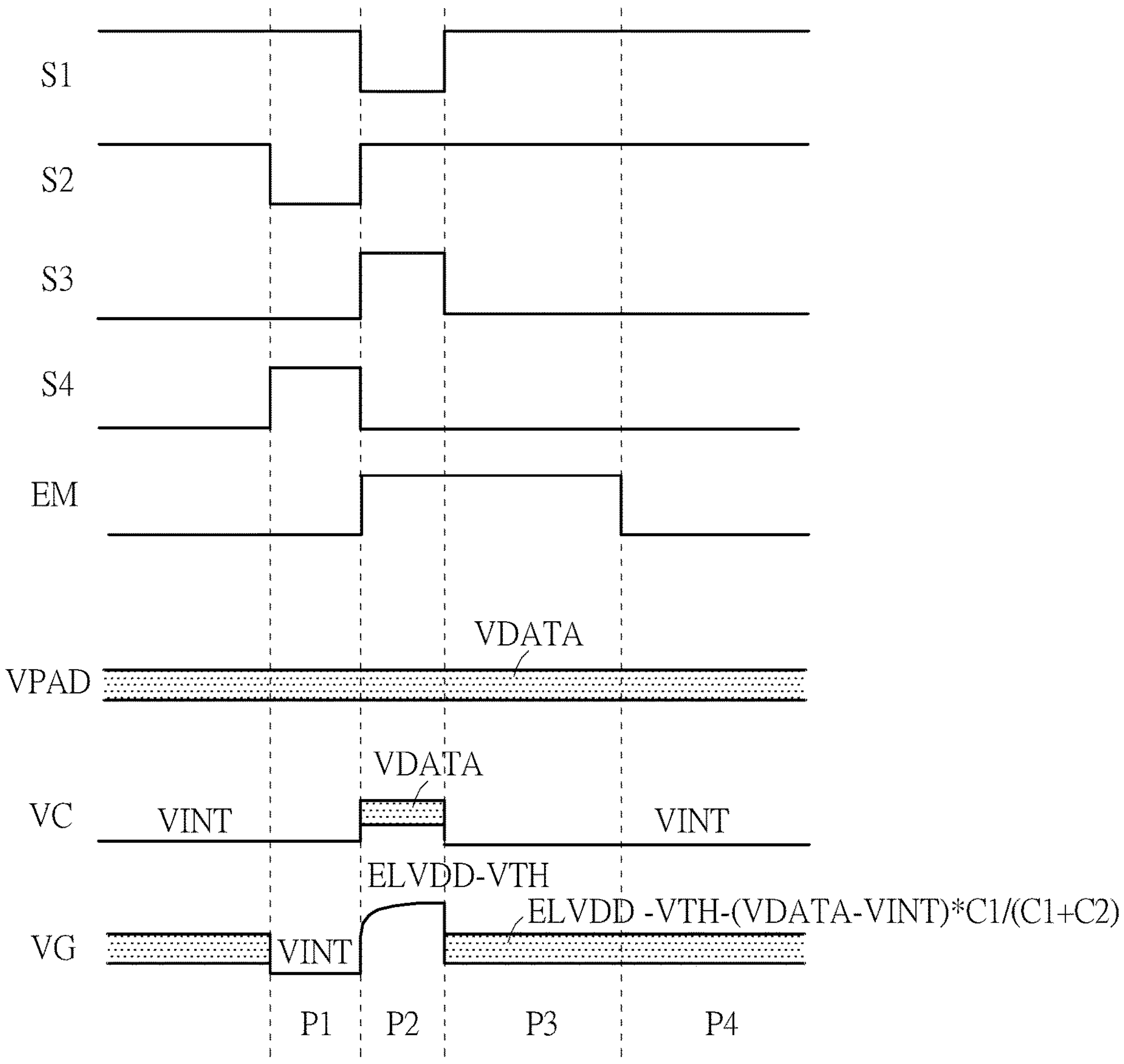
FIG. 8 is a waveform diagram of related signals and voltages of the pixel circuit shown in FIG. 7.

FIG. 8 is a waveform diagram of related signals and voltages of the pixel circuit 70, where the waveforms of the control signals S1-S4, the emission control signal EM, the voltage of the data input terminal VPAD, the voltage at the reference node VC, and the gate voltage VG of the driving transistor MDRV are shown. Since the pixel circuit 70 has the reset input terminal VPAD2 different from the data input terminal VPAD, the data input terminal VPAD may always provide the display data VDATA, while the initial voltage VINT is provided through the reset input terminal VPAD2.

Figure 9:
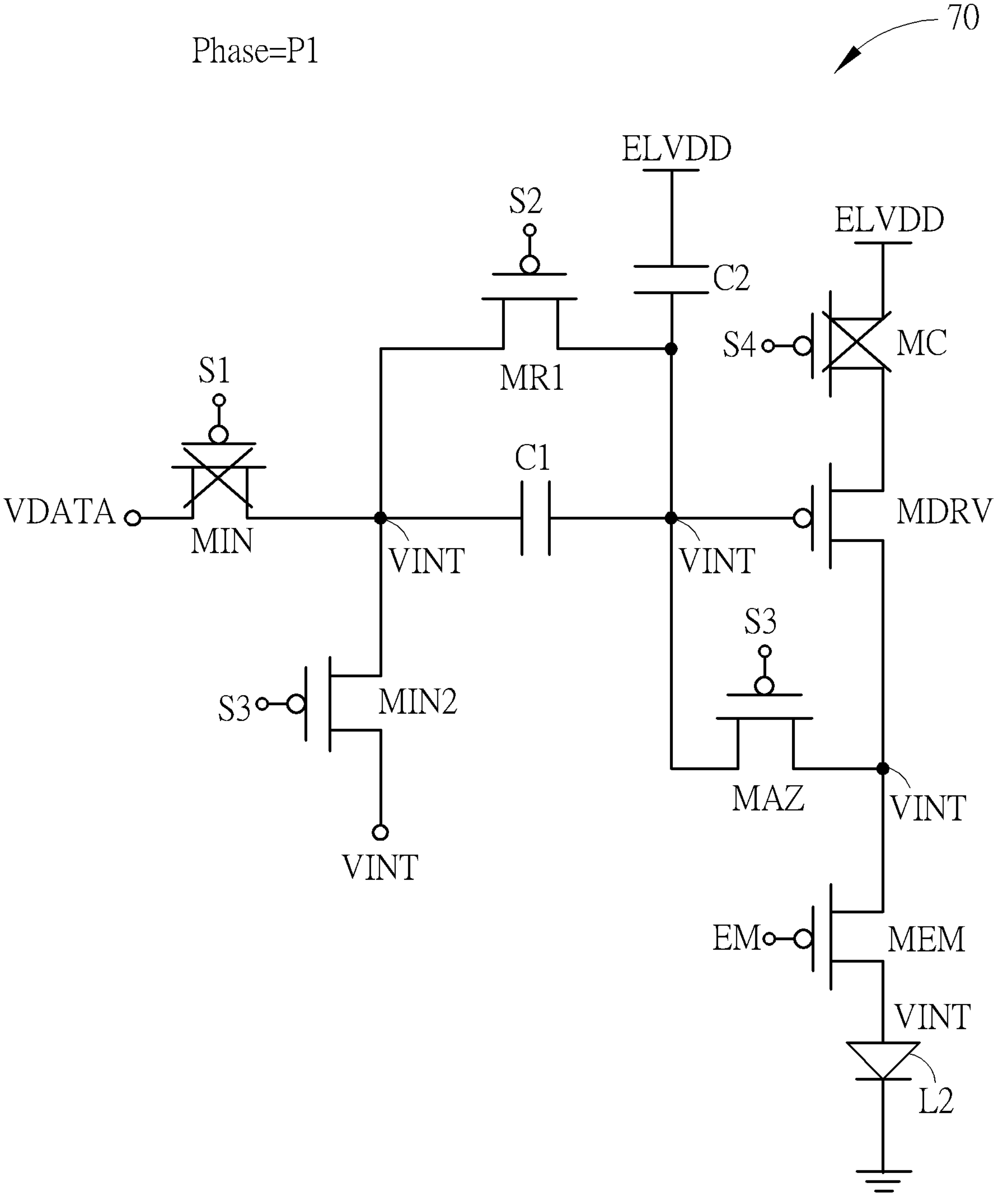
FIG. 9 illustrates the operations of the pixel circuit in the reset phase.

FIG. 9 illustrates the operations of the pixel circuit 70 in the phase P1 (i.e., the reset phase). Referring to FIG. 8 and FIG. 9, the cutoff transistor MC, controlled by the control signal S4, may be off in the phase P1, to cut off the leakage current during the initial operation. In addition, the cutoff transistor MC should be conducted in the phase P4 (i.e., the emission phase), to enable the output of the driving current ILED to the light emitting device L2, allowing the light emitting device to emit light.

In the pixel circuit 20, the reset transistor MR2 is connected to the anode of the light emitting device L2 without through the emission control transistor MEM; hence, in the reset phase, the emission control transistor MEM, which is on the current path flowing through the driving transistor MDRV and the light emitting device L2, may be turned off to cut off the leakage current. In other words, the emission control transistor MEM may serve as a cutoff transistor. In contrast, in the pixel circuit 70, the path for forwarding the initial voltage VINT to the light emitting device L2 includes the input transistor MIN2, the reset transistor MR1, the offset control transistor MAZ and the emission control transistor MEM, and these transistors should all be conducted in the reset phase, so as to successfully initialize the light emitting device L2. In this embodiment, the offset control transistor MAZ may serve as a reset transistor in the reset phase, to be coupled to the light emitting device L2 through the emission control transistor MEM. Therefore, the cutoff transistor MC should be deployed in the pixel circuit 70, and turned off in the reset phase to cut off the current path passing through the driving transistor MDRV when the initial voltage VINT is received, so as to eliminate the leakage current and avoid the deviation of the initial voltage VINT received by the light emitting device L2.

Figure 10:
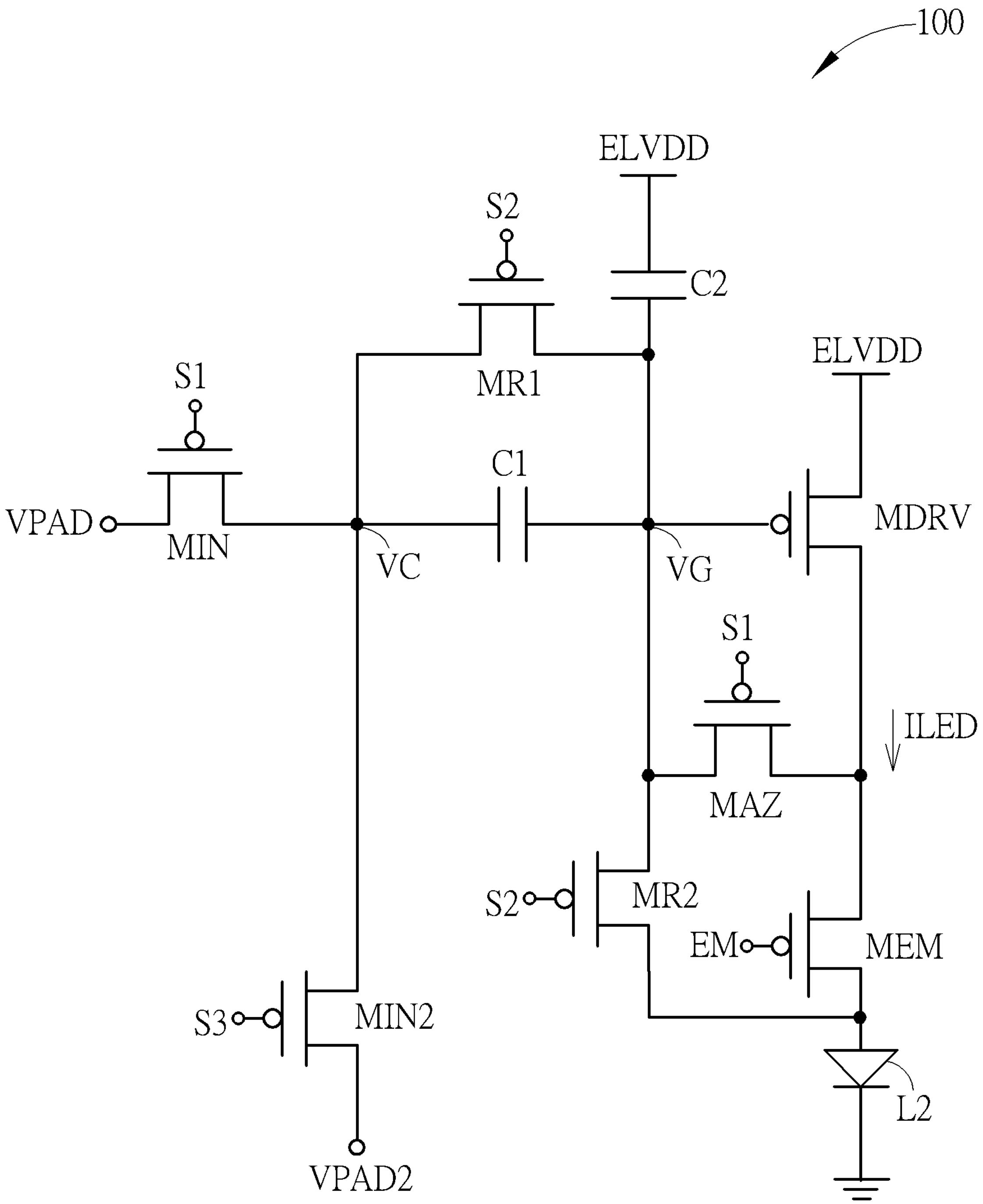
FIG. 10 is a schematic diagram of a pixel circuit of a display panel according to an embodiment of the present invention.

FIG. 10 is a schematic diagram of a pixel circuit 100 of a display panel according to an embodiment of the present invention. The structure of the pixel circuit 100 is similar to the structure of the pixel circuit 70, so signals and elements having similar functions are denoted by the same symbols. The difference between the pixel circuit 100 and the pixel circuit 70 is that, the pixel circuit 100 includes the reset transistor MR2 coupled between the anode of the light emitting device L2 and the gate terminal of the driving transistor MDRV, as similar to the implementation of the pixel circuit 20, and the cutoff transistor MC in the pixel circuit 70 is omitted in the pixel circuit 100.

Figure 11:
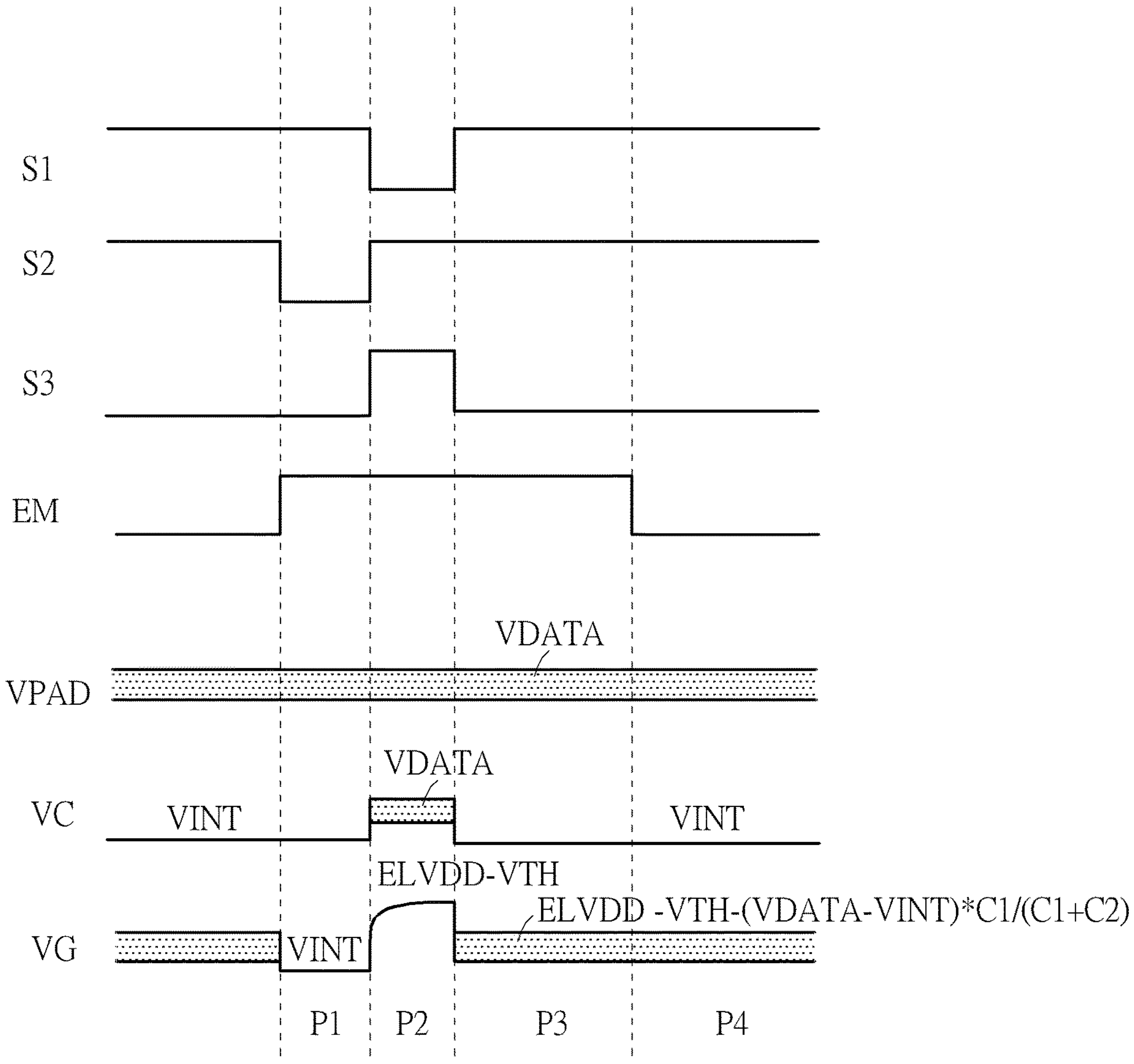
FIG. 11 is a waveform diagram of related signals and voltages of the pixel circuit shown in FIG. 10.

FIG. 11 is a waveform diagram of related signals and voltages of the pixel circuit 100, where the waveforms of the control signals S1-S3, the emission control signal EM, the voltage of the data input terminal VPAD, the voltage at the reference node VC, and the gate voltage VG of the driving transistor MDRV are shown. Similarly, since the pixel circuit 70 has the reset input terminal VPAD2 different from the data input terminal VPAD, the data input terminal VPAD may always provide the display data VDATA, while the initial voltage VINT is provided through the reset input terminal VPAD2.

Figure 12:
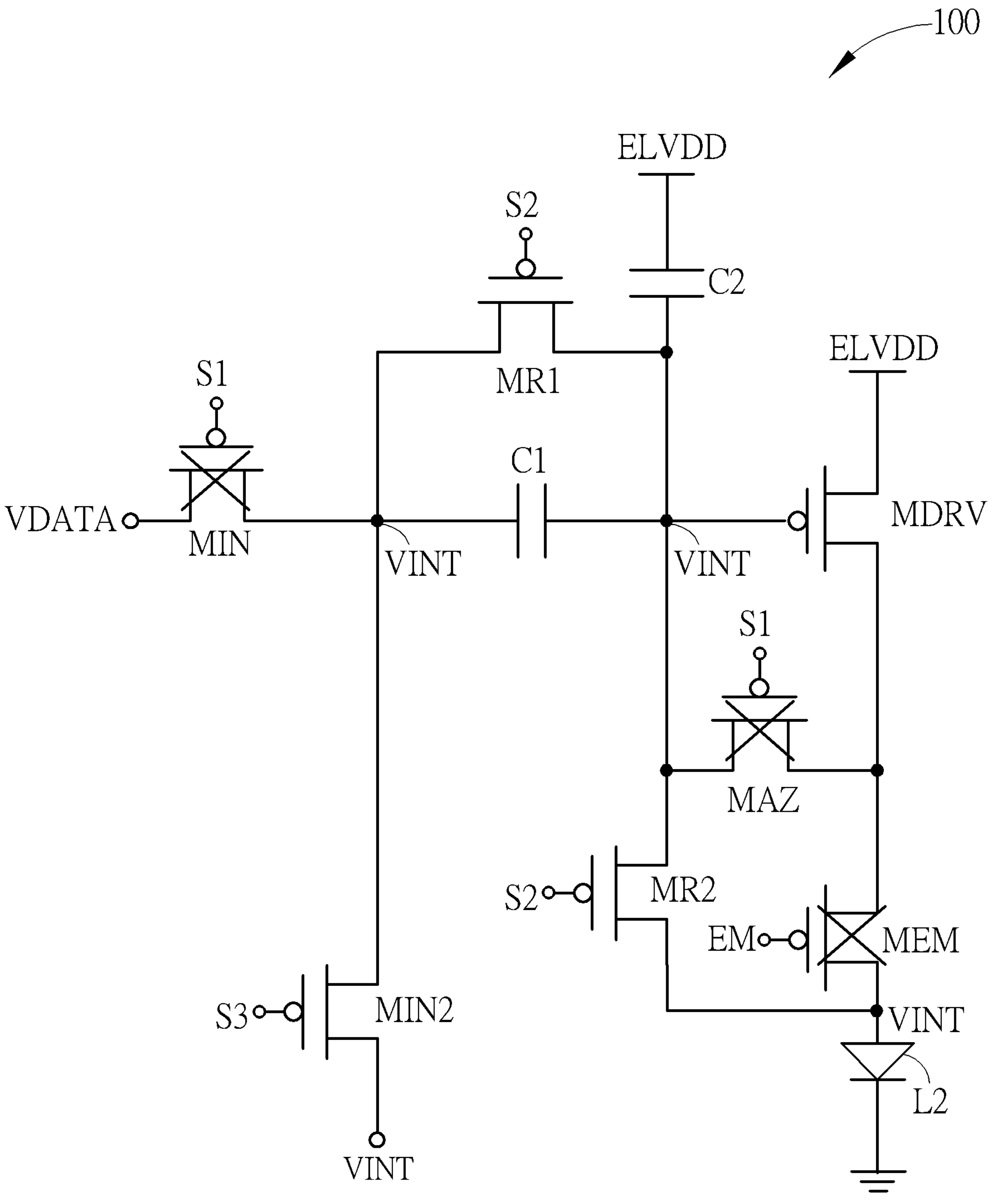
FIG. 12 illustrates the operations of the pixel circuit in the reset phase.

FIG. 12 illustrates the operations of the pixel circuit 100 in the phase P1 (i.e., the reset phase). Referring to FIG. 11 and FIG. 12, in the phase P1, the offset control transistor MAZ and the emission control transistor MEM are off, and thus there is no conducted current path between the power supply terminal and the light emitting device L2, and no conducted current path between the power supply terminal and the reset input terminal VPAD2; hence, there is no leakage current path during the reset operation, and no additional cutoff transistor MC is required. Other operations of the pixel circuit 100 are similar to those of the pixel circuits described above, and will be omitted herein.

Please note that the present invention aims at providing a novel pixel circuit for canceling the offset generated from the threshold voltage of the driving transistor in an OLED panel. Those skilled in the art may make modifications and alterations accordingly. For example, in the above embodiments, the transistors in the pixel circuit are PMOS transistors; but in other embodiments, similar implementations may be realized by using NMOS transistors or combinations of PMOS and NMOS transistors, where the levels of the control signals and the initial voltage may be modified accordingly. In the embodiments provided in this disclosure, the structures of pixel circuits apply 2 capacitors C1 and C2, but the present invention is not limited thereto. In another embodiment, the capacitor C2 may be omitted while remaining the capacitor C1, so as to realize a pixel circuit structure having only one capacitor. In addition, each of the above embodiments is applicable to the TFT process to be implemented on a glass substrate of the display panel, and also applicable to the CMOS process to be implemented in an IC. Further, the pixel circuit of the present invention may be applied to any self-luminous panel, which includes, but not limited to, an OLED panel, mini-LED panel, micro-LED panel, and micro-OLED panel.

The present invention provides several structures of the pixel circuits, in which the reset transistors may be implemented in any feasible manner to realize the initialization of the driving transistor and the light emitting device. As long as a first reset transistor is coupled between the reset input terminal and the gate terminal of the driving transistor and the first reset transistor is conducted in the reset phase, this first reset transistor may be applied to initialize the driving transistor. As long as a second reset transistor is coupled between the reset input terminal and the light emitting device and the second reset transistor is conducted in the reset phase, this second reset transistor may be applied to initialize the light emitting device. The following embodiments show other possible structures for realizing the reset transistors in the pixel circuits of the present invention.

Figure 13:
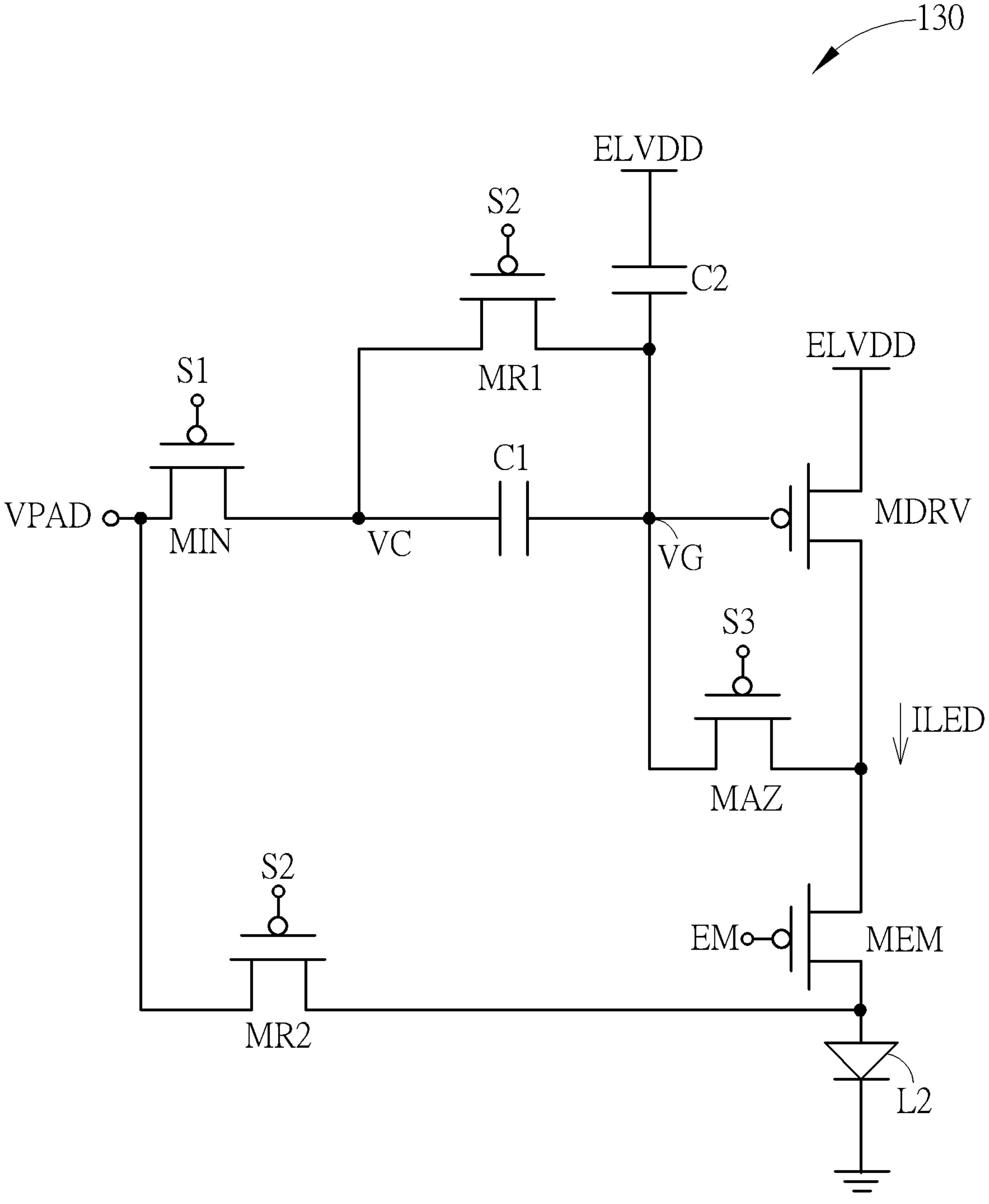
FIG. 13 is a schematic diagram of a pixel circuit of a display panel according to an embodiment of the present invention.

FIG. 13 is a schematic diagram of a pixel circuit 130 of a display panel according to an embodiment of the present invention. The structure of the pixel circuit 130 is similar to the structure of the pixel circuit 20, so signals and elements having similar functions are denoted by the same symbols. The difference between the pixel circuit 130 and the pixel circuit 20 is that, in the pixel circuit 130, the reset transistor MR2 is directly connected between the reset/data input terminal VPAD and the anode of the light emitting device L2 instead of being coupled between the gate terminal of the driving transistor MDRV and the light emitting device L2.

In the pixel circuit 20, the reset transistor MR2 is coupled to the reset/data input terminal VPAD through the input transistor MIN (and also through the reset transistor MR1). In such a situation, the signal path for forwarding the initial voltage VINT to the light emitting device L2 includes 3 switches respectively formed by the input transistor MIN, the reset transistor MR1 and the reset transistor MR2. These switches are conducted in the reset phase, but in the practical circuit, each conducted switch may have parasitic resistance that results in an RC delay. The RC delay may increase the time consumption for the anode voltage of the light emitting device L2 to reach the target initial voltage VINT, thereby decreasing the operational speed of the pixel circuit and reducing the possible refresh rate of the display panel.

In contrast, in the pixel circuit 130, the left terminal of the reset transistor MR2 is directly connected to the reset/data input terminal VPAD without through any other transistor or switch. In such a situation, the signal path for forwarding the initial voltage VINT to the light emitting device L2 includes only one switch formed by the reset transistor MR2. This implementation may minimize the RC delay on the signal path, to reduce the required time consumption for initializing the light emitting device L2. Therefore, the structure of the pixel circuit 130 may achieve the benefits of fast operational speed and higher refresh rate of the display panel.

Figure 14:
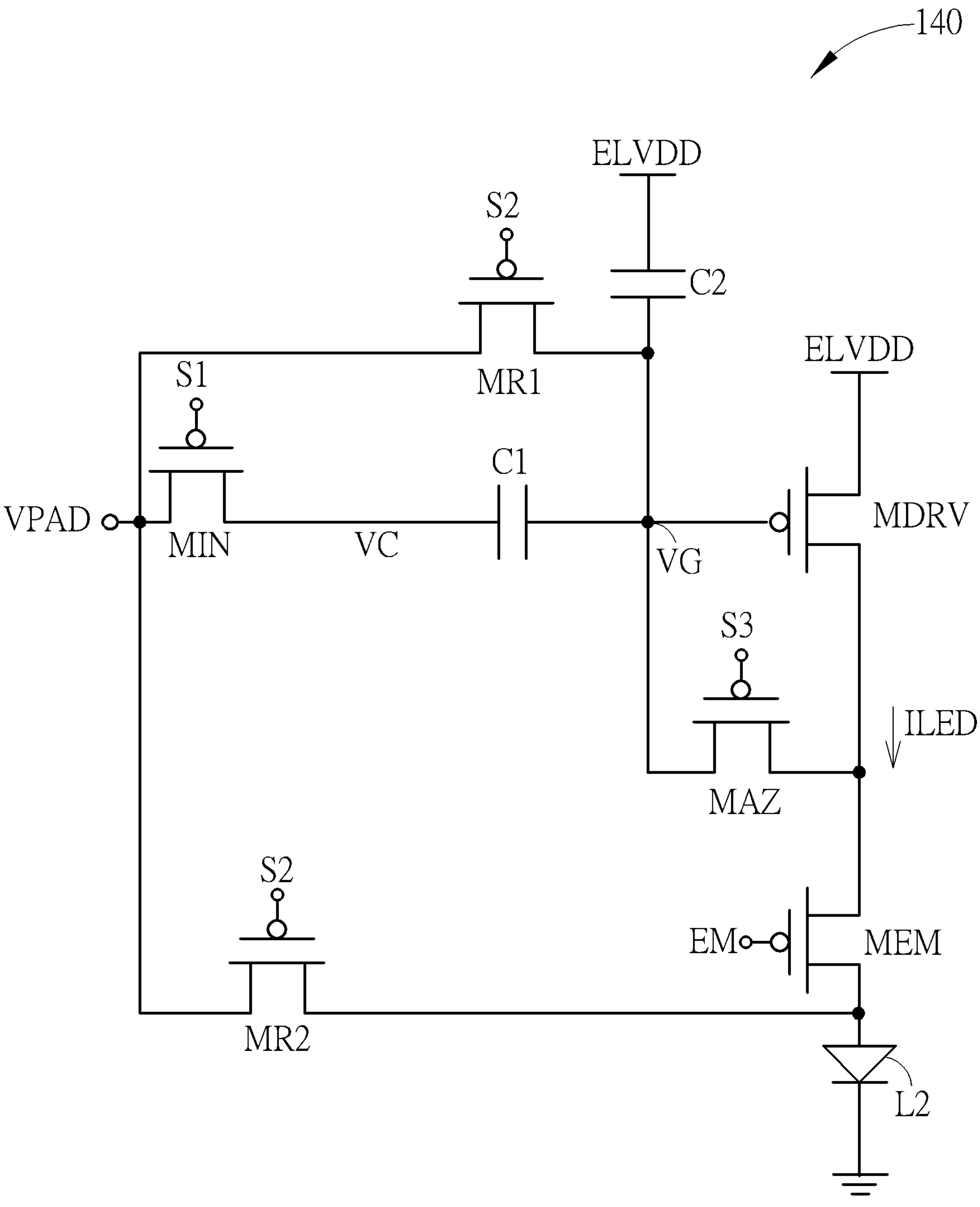
FIG. 14 is a schematic diagram of a pixel circuit of a display panel according to an embodiment of the present invention.

FIG. 14 is a schematic diagram of a pixel circuit 140 of a display panel according to an embodiment of the present invention. The structure of the pixel circuit 140 is similar to the structure of the pixel circuit 130, so signals and elements having similar functions are denoted by the same symbols. The difference between the pixel circuit 140 and the pixel circuit 130 is that, in the pixel circuit 140, the reset transistor MR1 is directly connected between the reset/data input terminal VPAD and the gate terminal of the driving transistor MDRV instead of being coupled between the reference node VC and the gate terminal of the driving transistor MDRV.

In the pixel circuit 20 or 130, the reset transistor MR1 is coupled to the reset/data input terminal VPAD through the input transistor MIN. In such a situation, the signal path for forwarding the initial voltage VINT to the gate terminal of the driving transistor MDRV includes 2 switches respectively formed by the input transistor MIN and the reset transistor MR1. These switches are conducted in the reset phase, but in the practical circuit, each conducted switch may have parasitic resistance that results in an RC delay. The RC delay may increase the time consumption for the gate voltage of the driving transistor MDRV to reach the target initial voltage VINT, thereby decreasing the operational speed of the pixel circuit and reducing the possible refresh rate of the display panel.

In contrast, in the pixel circuit 140, the left terminal of the reset transistor MR1 is directly connected to the reset/data input terminal VPAD without through any other transistor or switch. In such a situation, the signal path for forwarding the initial voltage VINT to the driving transistor MDRV includes only one switch formed by the reset transistor MR1. This implementation may minimize the RC delay on the signal path, to reduce the required time consumption for initializing the driving transistor MDRV.

Furthermore, in the pixel circuit 140, the reset transistor MR1 for initializing the driving transistor MDRV is directly connected between the reset/data input terminal VPAD and the gate terminal of the driving transistor MDRV, and the reset transistor MR2 for initializing the light emitting device L2 is directly connected between the reset/data input terminal VPAD and the anode of the light emitting device L2. As a result, the signal paths for initialization are most simplified, and thus the structure of the pixel circuit 140 may achieve the optimal performance in consideration of the operational speed in the reset phase of the display panel.

The detailed operations and related signal waveforms of the pixel circuits 130 and 140 are similar to those of the pixel circuit 20, and a skilled person may infer the operations of the pixel circuits 130 and 140 based on the illustrations in the above paragraphs and FIGS. 3 and 4A-4D, which will not be repeated herein for brevity.

Please note that various implementations of the pixel circuit provided in this disclosure may be combined in any manner to realize the initialization of the driving transistor and the light emitting device. For example, the data input terminal may serve as a reset input terminal for providing the initial voltage in the reset phase, or the initial voltage may be received from a reset input terminal other than the data input terminal. As for the reset transistor (e.g., MR1) for initializing the driving transistor, one of its terminals is coupled to the gate terminal of the driving transistor, and the other terminal may be coupled to the reset input terminal through an input transistor or directly connected to the reset input terminal. As for the reset transistor (e.g., MR2) for initializing the light emitting device, one of its terminals may be coupled to the anode of the light emitting device through the emission control transistor or directly connected to the anode of the light emitting device, and the other terminal may be coupled to the gate terminal of the driving transistor to be further coupled to the reset input terminal through another reset transistor and/or the input transistor, coupled to a reference node to be further coupled to the reset input terminal through the input transistor, or directly connected to the reset input terminal. If the signal path for initializing the light emitting device passes through the emission control transistor, the emission control transistor should be conducted in the reset phase; hence, a cutoff transistor may be deployed to cut off a leakage current path from the power supply terminal to the light emitting device and/or the reset input terminal. All of these implementations and alterations may be selectively applied to realize various alternative pixel structures in the embodiments of the present invention.

Figure 15:
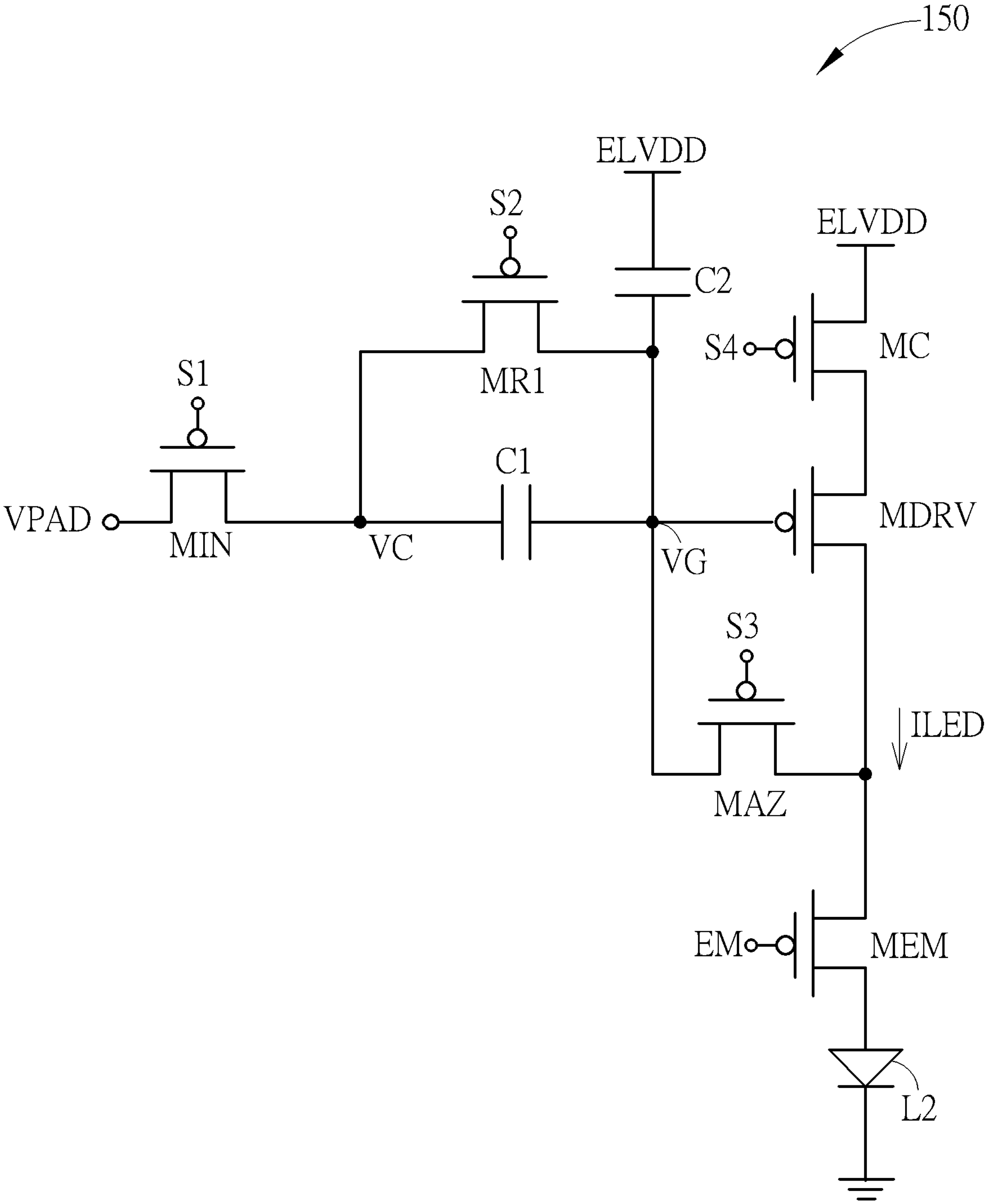
FIG. 15 is a schematic diagram of a pixel circuit of a display panel according to an embodiment of the present invention.

Several possible pixel structures are further described in the following paragraphs. FIG. 15 is a schematic diagram of a pixel circuit 150 of a display panel according to an embodiment of the present invention. In the pixel circuit 150, the reset transistor MR1 is coupled between the reference node VC and the gate terminal of the driving transistor MDRV. The offset control transistor MAZ and the emission control transistor MEM may also serve as reset transistors, which are conducted to forward the initial voltage VINT to the light emitting device L2 in the reset phase; hence, a cutoff transistor MC is deployed on the current path of the driving transistor MDRV, and may be turned off in the reset phase to avoid the leakage current.

Figure 16:
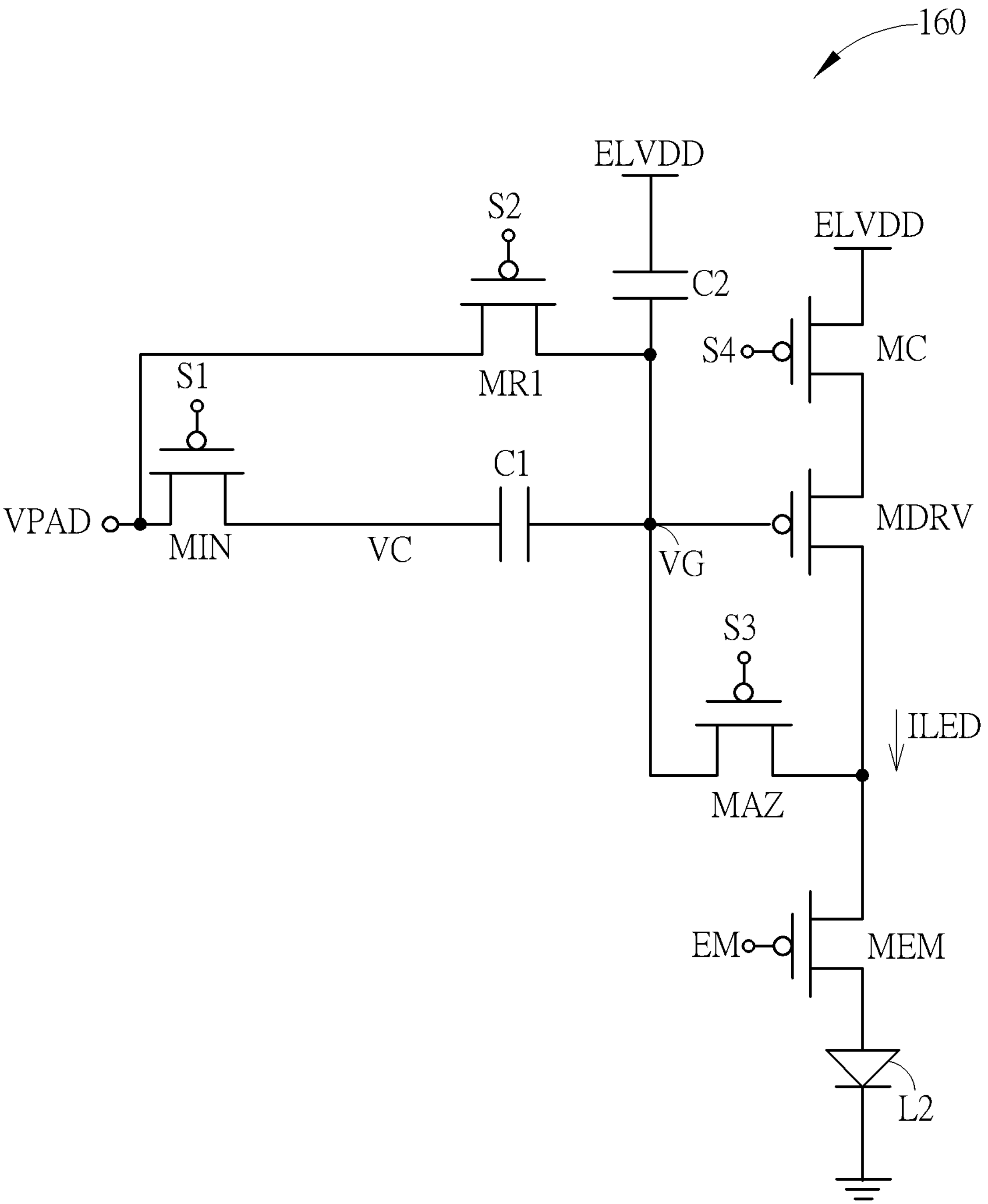
FIG. 16 is a schematic diagram of another pixel circuit of a display panel according to an embodiment of the present invention.

FIG. 16 is a schematic diagram of another pixel circuit 160 of a display panel according to an embodiment of the present invention. In the pixel circuit 160, the reset transistor MR1 is directly connected to the reset/data input terminal VPAD without through any other transistor. Similarly, the offset control transistor MAZ and the emission control transistor MEM may also serve as reset transistors, which are conducted to forward the initial voltage VINT to the light emitting device L2 in the reset phase, and the cutoff transistor MC is deployed to avoid the leakage current.

Figure 17:
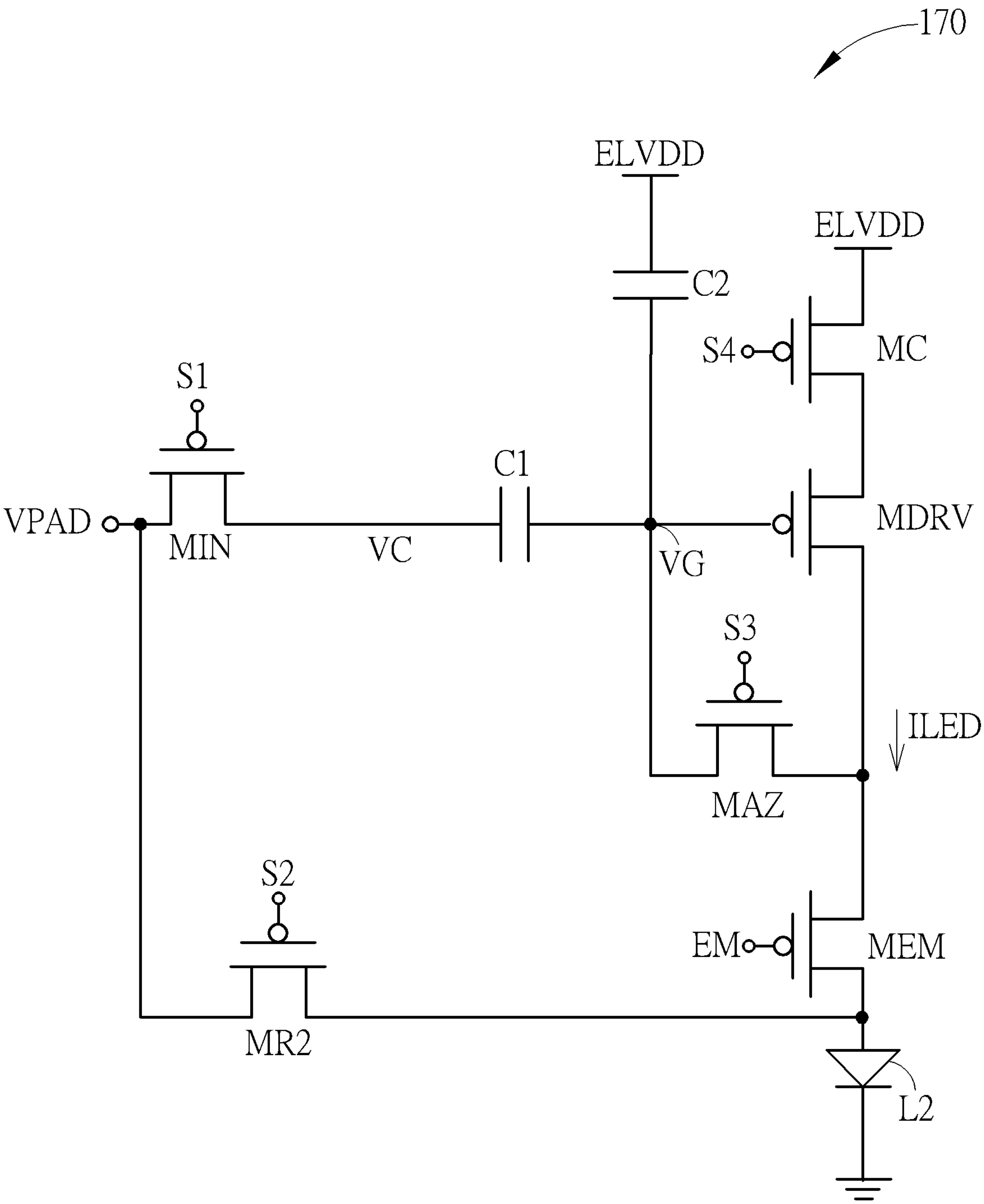
FIG. 17 is a schematic diagram of a further pixel circuit of a display panel according to an embodiment of the present invention.

FIG. 17 is a schematic diagram of a further pixel circuit 170 of a display panel according to an embodiment of the present invention. In the pixel circuit 170, the reset transistor MR2 is connected between the reset/data input terminal VPAD and the anode of the light emitting device L2, to forward the initial voltage VINT to the light emitting device L2. The offset control transistor MAZ and the emission control transistor MEM are conducted in the reset phase, to forward the initial voltage VINT from the light emitting device L2 to the gate terminal of the driving transistor MDRV in the reset phase. In other words, the offset control transistor MAZ and the emission control transistor MEM may also serve as reset transistors for initializing the driving transistor MDRV, and other reset transistor (s) such as MR1 in the previous embodiments may be omitted. Since the emission control transistor MEM should be conducted in the reset phase, the cutoff transistor MC is deployed and cutoff in the reset phase to avoid the leakage current.

To sum up, the present invention provides a pixel circuit for canceling the offset generated from the threshold voltage of the driving transistor. The operations of the pixel circuit include a reset phase where the driving transistor and the light emitting device are initialized simultaneously. The initial voltage for initializing the driving transistor and the light emitting device may be received from a reset input terminal, which may be the same as a data input terminal that provides the display data, or may be different from the data input terminal. A first reset transistor may be coupled between the reset input terminal and the driving transistor, to forward the initial voltage to the gate terminal of the driving transistor. In one or several embodiments, the first reset transistor may be connected in parallel with the capacitor for coupling the display data. A second reset transistor may be coupled between the reset input terminal and the light emitting device, to forward the initial voltage to the anode of the light emitting device. In one or several embodiments, a cutoff transistor may be deployed to avoid the leakage current in the reset phase. The first reset transistor and the second reset transistor may be deployed and connected in any possible manner, to realize the initialization of the driving transistor and the light emitting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel circuit of a display panel, comprising:

a light emitting device;

a driving transistor, having a gate terminal;

a capacitor, comprising:

a first terminal, coupled to the gate terminal of the driving transistor; and a second terminal, coupled to a reset input terminal of the pixel circuit;

a first reset transistor, comprising:

a first terminal, coupled to the gate terminal of the driving transistor; and a second terminal, coupled to the reset input terminal; and a second reset transistor, comprising:

a first terminal, coupled to the light emitting device; and a second terminal, coupled to the reset input terminal.

2. The pixel circuit of claim 1, wherein the reset input terminal is a data input terminal for receiving a display data.

3. The pixel circuit of claim 1, wherein the reset input terminal is different from a data input terminal for receiving a display data.

4. The pixel circuit of claim 1, wherein the first reset transistor is coupled to the reset input terminal through an input transistor.

5. The pixel circuit of claim 1, wherein the first reset transistor is directly connected to the reset input terminal.

6. The pixel circuit of claim 1, wherein the second reset transistor is coupled to the reset input terminal through an input transistor.

7. The pixel circuit of claim 1, wherein the second reset transistor is directly connected to the reset input terminal.

8. The pixel circuit of claim 1, wherein the second reset transistor is coupled to the light emitting device through an emission control transistor.

9. The pixel circuit of claim 1, wherein the second reset transistor is directly connected to the light emitting device.

10. The pixel circuit of claim 1, wherein the first reset transistor forms a signal path for forwarding an initial voltage to the driving transistor to initialize the driving transistor.

11. The pixel circuit of claim 1, wherein the second reset transistor forms a signal path for forwarding an initial voltage to the light emitting device to initialize the light emitting device.

12. The pixel circuit of claim 1, wherein an initial voltage initializes the driving transistor through the first reset transistor, and simultaneously initializes the light emitting device through the second reset transistor.

13. The pixel circuit of claim 1, wherein an initial voltage is forwarded to the gate terminal of the driving transistor through the first reset transistor, and a display data is coupled to the gate terminal of the driving transistor through the capacitor.

14. The pixel circuit of claim 1, further comprising:

a cutoff transistor, coupled to the driving transistor, to cut off a current path passing through the driving transistor when an initial voltage for initializing the driving transistor or the light emitting device is received.

15. A pixel circuit of a display panel, comprising:

a light emitting device;

a driving transistor, having a gate terminal, to drive the light emitting device;

a capacitor, coupled between a reset input terminal of the pixel circuit and the gate terminal of the driving transistor;

a first reset transistor, coupled between the reset input terminal and the gate terminal of the driving transistor, to initialize the driving transistor; and a second reset transistor, coupled between the reset input terminal and the light emitting device, to initialize the light emitting device;

wherein the driving transistor and the light emitting device are initialized simultaneously.

16. The pixel circuit of claim 15, wherein the driving transistor and the light emitting device are initialized by receiving a same initial voltage.

17. The pixel circuit of claim 16, wherein the initial voltage is received from a data input terminal for receiving a display data.

18. The pixel circuit of claim 16, wherein the initial voltage is received from a reset input terminal different from a data input terminal for receiving a display data.

19. The pixel circuit of claim 16, wherein the first reset transistor forms a signal path for forwarding the initial voltage to the driving transistor to initialize the driving transistor.

20. The pixel circuit of claim 19, wherein the signal path for forwarding the initial voltage to the driving transistor includes only one switch.

21. The pixel circuit of claim 16, wherein the second reset transistor forms a signal path for forwarding the initial voltage to the light emitting device to initialize the light emitting device.

22. The pixel circuit of claim 21, wherein the signal path for forwarding the initial voltage to the light emitting device includes only one switch.

23. A pixel circuit of a display panel, comprising:

a light emitting device;

a driving transistor, having a gate terminal, to drive the light emitting device;

a capacitor, coupled between a reset input terminal of the pixel circuit and the gate terminal of the driving transistor;

a first reset transistor, coupled between the reset input terminal and the gate terminal of the driving transistor; and a second reset transistor, coupled between the reset input terminal and the light emitting device;

wherein the first reset transistor and the capacitor are connected in parallel.

24. The pixel circuit of claim 23, wherein an initial voltage is forwarded to the gate terminal of the driving transistor through the first reset transistor, and a display data is coupled to the gate terminal of the driving transistor through the capacitor.

25. The pixel circuit of claim 23, wherein a first terminal of the first reset transistor and a first terminal of the capacitor are commonly coupled to the reset input terminal through an input transistor.

26. The pixel circuit of claim 25, wherein a second terminal of the first reset transistor and a second terminal of the capacitor are commonly and directly connected to the gate terminal of the driving transistor.

27. A pixel circuit of a display panel, comprising:

a light emitting device;

a driving transistor, having a gate terminal, to drive the light emitting device;

a capacitor, coupled between a reset input terminal of the pixel circuit and the gate terminal of the driving transistor;

a first reset transistor, coupled between the reset input terminal and the gate terminal of the driving transistor;

a second reset transistor, coupled between the reset input terminal and the light emitting device; and a cutoff transistor, coupled to the driving transistor, to cut off a current path passing through the driving transistor when an initial voltage for initializing the driving transistor or the light emitting device is received.

28. The pixel circuit of claim 27, wherein the cutoff transistor comprises an emission control transistor coupled between the driving transistor and the light emitting device.

29. The pixel circuit of claim 28, wherein the second reset transistor is directly connected to the light emitting device without through the emission control transistor.

30. The pixel circuit of claim 27, wherein the cutoff transistor is coupled between the driving transistor and a power supply terminal.

31. The pixel circuit of claim 30, wherein the second reset transistor is coupled to the light emitting device through an emission control transistor.

32. The pixel circuit of claim 27, wherein the cutoff transistor is cutoff in a reset phase where the initial voltage is received, and conducted in an emission phase where the light emitting device emits light.

* * * * *